(12) United States Patent
Montagut et al.

(10) Patent No.: US 9,047,490 B2
(45) Date of Patent: Jun. 2, 2015

(54) METHOD AND A SYSTEM FOR SECURE EXECUTION OF WORKFLOW TASKS IN A DISTRIBUTED WORKFLOW MANAGEMENT SYSTEM WITHIN A DECENTRALIZED NETWORK SYSTEM

(75) Inventors: Frederic Montagut, Antibes (FR); Laurent Gomez, Le Cannet (FR); Cedric Hebert, Mougins (FR); Cedric Ulmer, Nice (FR)

(73) Assignee: SAP SE, Walldorf (DE)

( * ) Notice: Subject to any disclaimer, the term of this patent is extended or adjusted under 35 U.S.C. 154(b) by 1636 days.

(21) Appl. No.: 12/098,012

(22) Filed: Apr. 4, 2008

(65) Prior Publication Data

US 2009/0077376 A1    Mar. 19, 2009

(30) Foreign Application Priority Data

Apr. 4, 2007   (EP) ...................................... 07290413

(51) Int. Cl.
  *G06F 15/16*   (2006.01)
  *G06F 21/64*   (2013.01)
  *G06F 21/62*   (2013.01)
(52) U.S. Cl.
  CPC ............ *G06F 21/64* (2013.01); *G06F 21/6209* (2013.01); *G06F 21/62* (2013.01)
(58) Field of Classification Search
  CPC ...... G06F 21/62; G06F 21/6209; G06F 21/64
  See application file for complete search history.

(56) References Cited

U.S. PATENT DOCUMENTS 5,018,196 A * 5/1991 Takaragi et al. ................. 380/30
5,337,357 A * 8/1994 Chou et al. ...................... 705/56

(Continued)

FOREIGN PATENT DOCUMENTS

EP      1638336 A1 *  3/2006
JP      2004-200740     7/2004

(Continued)

OTHER PUBLICATIONS

Borrell, "Protecting general flexible itineraries of mobile agents", 2002, ISSN 0302-9743, pp. 382-396.*

(Continued)

*Primary Examiner* — Tamara T Kyle
*Assistant Examiner* — Anthony Fabbri
(74) *Attorney, Agent, or Firm* — Fish & Richardson P.C.

(57) ABSTRACT

There are provided a method, a system and an initiator server for a secure execution of workflow tasks of a workflow to be executed according to a given execution pattern in a distributed workflow management system within a decentralized network system with a plurality of servers ($b_0, b_1, \ldots, b_n$) including at least an initiator server and at least a number of groups of servers of the plurality of servers. Each group satisfies a policy ($pol_i$) of a vertex, and thus, knows a corresponding policy key pair including a policy private key ($SK_{pol_i}$) and a policy public key ($PK_{pol_i}$), respectively. Each vertex denotes a set of workflow tasks to be executed in accord with the execution pattern and is assigned a vertex key pair including a vertex private key and a vertex public key. The vertex private keys and the policy public keys are jointly encrypted within a first onion structure, the first onion structure being built up of a number of onion layers representing the execution pattern which defines a succession of vertices such that each layer is decryptable by using the policy private key of exactly one vertex thus revealing the corresponding vertex private key.

25 Claims, 9 Drawing Sheets

(56) References Cited

U.S. PATENT DOCUMENTS

| | | | |
|---|---|---|---|
| 5,452,442 A * | 9/1995 | Kephart | 714/38.1 |
| 5,493,728 A * | 2/1996 | Solton et al. | 711/113 |
| 5,640,554 A * | 6/1997 | Take | 1/1 |
| 5,713,017 A * | 1/1998 | Lin et al. | 1/1 |
| 5,790,886 A * | 8/1998 | Allen | 710/5 |
| 5,831,975 A * | 11/1998 | Chen et al. | 370/256 |
| 5,862,346 A * | 1/1999 | Kley et al. | 709/245 |
| 5,884,046 A * | 3/1999 | Antonov | 709/238 |
| 5,892,914 A * | 4/1999 | Pitts | 709/219 |
| 5,909,681 A * | 6/1999 | Passera et al. | 1/1 |
| 5,917,915 A * | 6/1999 | Hirose | 380/228 |
| 5,920,697 A * | 7/1999 | Masters et al. | 709/219 |
| 5,935,246 A * | 8/1999 | Benson | 726/28 |
| 6,023,586 A * | 2/2000 | Gaisford et al. | 717/178 |
| 6,108,703 A * | 8/2000 | Leighton et al. | 709/226 |
| 6,119,165 A * | 9/2000 | Li et al. | 709/229 |
| 6,125,365 A * | 9/2000 | Nakatsugawa | 340/9.1 |
| 6,128,647 A * | 10/2000 | Haury | 709/207 |
| 6,311,206 B1 * | 10/2001 | Malkin et al. | 709/202 |
| 6,311,265 B1 * | 10/2001 | Beckerle et al. | 712/203 |
| 6,398,245 B1 * | 6/2002 | Gruse et al. | 280/228 |
| 6,505,241 B2 * | 1/2003 | Pitts | 709/219 |
| 6,738,900 B1 * | 5/2004 | Hardjono et al. | 713/156 |
| 6,865,674 B1 * | 3/2005 | Mancini et al. | 713/157 |
| 6,891,802 B1 * | 5/2005 | Hubbard | 370/241 |
| 6,966,059 B1 * | 11/2005 | Shetty et al. | 717/172 |
| 6,986,050 B2 * | 1/2006 | Hypponen | 713/183 |
| 7,065,493 B1 * | 6/2006 | Homsi | 705/7.26 |
| 7,130,426 B1 * | 10/2006 | Cha et al. | 380/201 |
| 7,213,005 B2 * | 5/2007 | Mourad et al. | 705/64 |
| 7,831,827 B2 * | 11/2010 | Walmsley | 713/168 |
| 7,831,829 B2 * | 11/2010 | Appenzeller et al. | 713/170 |
| 8,364,729 B2 * | 1/2013 | Balinsky et al. | 707/822 |
| 2003/0093678 A1 * | 5/2003 | Bowe et al. | 713/180 |
| 2004/0125402 A1 * | 7/2004 | Kanai et al. | 358/1.15 |
| 2004/0193880 A1 * | 9/2004 | Walmsley | 713/168 |
| 2005/0008163 A1 * | 1/2005 | Leser et al. | 380/281 |
| 2005/0027871 A1 * | 2/2005 | Bradley et al. | 709/227 |
| 2005/0093868 A1 * | 5/2005 | Hinckley | 345/502 |
| 2005/0097061 A1 * | 5/2005 | Shapiro et al. | 705/67 |
| 2005/0114670 A1 * | 5/2005 | Bowe et al. | 713/180 |
| 2005/0114674 A1 * | 5/2005 | Carley | 713/182 |
| 2005/0147240 A1 * | 7/2005 | Agrawal et al. | 380/28 |
| 2005/0251491 A1 * | 11/2005 | Medina et al. | 705/71 |
| 2005/0273853 A1 * | 12/2005 | Oba et al. | 726/22 |
| 2006/0056621 A1 * | 3/2006 | Ramzan et al. | 380/28 |
| 2006/0159270 A1 * | 7/2006 | Urivskiy et al. | 380/277 |
| 2006/0190723 A1 * | 8/2006 | Benson | 713/165 |
| 2008/0016341 A1 * | 1/2008 | Staddon et al. | 713/165 |
| 2008/0046757 A1 * | 2/2008 | Staddon et al. | 713/189 |

FOREIGN PATENT DOCUMENTS

| | | |
|---|---|---|
| JP | 2005-025578 | 1/2005 |
| WO | 02/39401 | 5/2002 |

OTHER PUBLICATIONS

Karjoth et al., "Protecting the computation results of free-roaming agents", 1998, ISBN 978-3-540-64959-5, pp. 195-207.*

Montagut et al.; Enabling Pervasive Execution of Workflows; IEEE; 2005; 10 Pages.*

Montagut et al.; Bridging Security and Fault Management within Distributed Workflow Management Systems; Jan.-Mar. 2008; IEEE Transactions on Services Computing; vol. 1 No. 1; pp. 33-48.*

Mir and Borrell, "Protecting general flexible itineraries of mobile agents," *ICICS*, 2001, Heidelberg, vol. 2288, pp. 382-396.

Mir and Borrell, "Protecting mobile agent itineraries," *MATA*, 2003, Heidelberg, vol. 2881, pp. 275-285.

Karjoth et al., "Protecting the computation results of free-roaming agents," *Proceedings of the Second International Workshop on Mobile Agents*, 1998, vol. 1477, pp. 195-207.

Montagut and Molva, "Enabling pervasive execution of workflows," *Collaborative Computing: Networking, Applications and Worksharing, 2005 International Conference on Volume*, 2005, 10 pages.

* cited by examiner

Figure 7

METHOD AND A SYSTEM FOR SECURE EXECUTION OF WORKFLOW TASKS IN A DISTRIBUTED WORKFLOW MANAGEMENT SYSTEM WITHIN A DECENTRALIZED NETWORK SYSTEM

CROSS-REFERENCE TO RELATED APPLICATION

This application claims the benefit of European Patent Application Serial No. 07 290 413.9, filed on Apr. 4, 2007, which is incorporated by reference in its entirety.

TECHNICAL FIELD

This description refers to a distributed workflow management system within a decentralized network system, particularly to a secure execution of workflow tasks of a workflow in a distributed workflow management system within a decentralized network system.

DESCRIPTION OF THE RELATED ART

In computer science workflow management systems are used to distribute the execution of workflow tasks to a number of servers within a network system. The infrastructure either can be a centralized workflow management system comprising a trusted centralized point of coordination or a more flexible decentralized workflow management system. Existing distributed workflow management systems eliminate on the one hand the need for a centralized coordinator that can be a performance bottleneck in some business scenarios. This flexibility introduced by decentralized workflow management systems on the other hand raises new security requirements like integrity of workflow execution in order to assure the compliance of the overall sequence of operations with a pre-defined workflow execution plan. Moreover, as opposed to usual centralized workflow management systems, the distributed execution of workflows can not rely on a trusted centralized coordination mechanism to manage the most basic execution primitives such as message routing between servers. Yet, existing decentralized workflow management systems appear to be limited when it comes to integrating security mechanisms that meet these specific requirements in addition to the ones identified in the centralized setting. Even though some recent research efforts in the field of distributed workflow security have indeed been focusing on issues related to the management of rights in server assignment or detecting conflicts of interests, basic security issues related to the security of the overall workflow execution such as integrity and evidence of execution have not yet been addressed.

Security of cross-organizational workflows in both centralized and decentralized settings has been an active research field over the passed years mainly focusing on access control, and separation of duty in conflict of interests issues. However, in the decentralized setting issues related to the integrity of workflow execution and workflow instance forging have been left aside.

SUMMARY

Therefore, it is an object to provide new security mechanisms supporting a secure execution of workflows in a decentralized setting. The proposed mechanisms assure the integrity of the distributed execution of workflows and prevent servers from being involved in a workflow instance forged by a malicious peer. Therefore, it is capitalized in the following on onion encryption techniques and security policy models in the design of these mechanisms.

In one aspect, there is provided a method for a secure execution of workflow tasks of a workflow to be executed according to a given execution pattern in a distributed workflow management system with a plurality of servers, each server satisfying a policy of a vertex of the workflow, and thus, knowing a corresponding policy private key and a corresponding policy public key, respectively, the method comprising, starting at an i'th server which is determined at runtime in accord with the execution pattern to perform the i'th vertex of the workflow, the policy of which the i'th server satisfies, at least the following operations:

receiving a first onion structure being built up of a number of onion layers representing the execution pattern with an outermost layer including an i'th vertex private key assigned to the i'th vertex and encrypted with the i'th policy public key, receiving the workflow originating from an initiator server and including workflow data encoded by a corresponding i'th vertex public key, decoding the i'th vertex private key by using the i'th policy private key, and decoding the workflow data encoded by the i'th vertex public key from the received workflow by using the i'th vertex private key, executing the i'th vertex and processing the decoded workflow data accordingly, and updating the workflow according to the executed i'th vertex and the processed workflow data.

In another aspect, a method for a secure execution of workflow tasks of a workflow to be executed according to a given execution pattern in a distributed workflow management system within a decentralized network system is provided. The network system comprises a plurality of servers including at least an initiator server and at least a number of groups of servers of the plurality of servers, wherein each group satisfies a policy of a vertex, and thus, knows a corresponding policy key pair including a policy private key and a policy public key, respectively. Further, each vertex denotes a set of workflow tasks to be executed in accord with the execution pattern and is assigned a vertex key pair including a vertex private key and a vertex public key. The vertex private keys and the policy public keys are jointly encrypted within a first onion structure, the first onion structure being built up of a number of onion layers reproducing the execution pattern which defines a succession of vertices such that each layer is decryptable by using the policy private key of exactly one vertex thus revealing the corresponding vertex private key. The proposed method comprises, starting at an i'th server as the one server of one of the groups of servers which is determined at runtime in accord with the execution pattern to perform one of the vertices of the workflow, the policy of which the i'th server satisfies, called herein the i'th vertex, at least the following operations:

receiving the first onion structure with an outermost layer including the i'th vertex private key and encrypted with the i'th policy public key, receiving the workflow originating from the initiator server and including workflow data encoded by the i'th vertex public key, decoding the i'th vertex private key by using the known i'th policy private key, and decoding the workflow data encoded by the i'th vertex public key from the received workflow by using the i'th vertex private key, executing the i'th vertex and processing the decoded workflow data accordingly, and updating the workflow according to the executed i'th vertex and the processed workflow data.

It is possible that the operation of updating the workflow comprises encoding at least the processed workflow data with the (i+1)'th vertex public key corresponding to the succession of vertices and adding those workflow data to the workflow, and that the method further comprises the following operation:

sending the updated workflow and the partly decoded first onion structure further to at least one (i+1)'th server as one server of the group of servers satisfying the policy of an (i+1)'th vertex as the next vertex in the succession of vertices.

Thereby, the i'th server can choose the (i+1)'th server at runtime to execute the (i+1)'th vertex as the vertex following the i'th vertex in the succession of vertices.

It is supposable that the processed workflow data are included in a data block consisting of two fields, the processed workflow data that have last been modified during execution of the i'th vertex and a signature, and wherein the data block is associated with a set of signatures that is computed by the i'th server assigned to the i'th vertex at runtime.

The data block and the set of signatures can be determined according to the following formulas:

$$B_k^a = (d_k, \text{sign}_a(d_k))$$

$$\text{sign}_a(d_k) = \{h_1(d_k)\}_{SK_a}$$

wherein $d_k$ describes the actual data, $h_1$ a first hash function, and $SK_a$ the private vertex key of vertex a.

Generally, it is possible that the first onion structure is determined by the initiator server.

According to a further aspect, along with the execution of the workflow, a second onion structure is built at each execution step with vertex private keys based on the workflow execution pattern, the second onion structure being initialized by the initiator server, so that the i'th server receives the second onion structure with (i−1) layers and encrypts its upper layer with the i'th vertex private key to extend the second onion structure up to i layers which is sent to the (i+1)'th server upon completion of the i'th vertex.

Afterwards, the i'th server sends a workflow message to the (i+1)'th server upon execution of the i'th vertex and updating of the workflow, the workflow message including the updated workflow, the first onion structure and the extended second onion structure so that the (i+1)'th server can first retrieve the (i+1)'th vertex private key from the first onion structure, can verify compliance of the workflow execution with the workflow pattern using the extended second onion structure and finally can execute the (i+1)'th vertex and process the workflow data accordingly.

It is possible that the second onion structure is initiated by the initiator server who computes the first layer as the most inner layer by determining a hash value of a workflow policy using the first hash function and encoding the according to the succession of vertices.

The workflow policy can be defined by the initiator server. hash value by the policy private key of the first vertex It can be provided that each vertex key pair assigned to exactly one vertex is defined for a single instance of the workflow so that it cannot be reused during any other workflow instance.

The first onion structure can adopt and represent a wide variety of different execution patterns, also called workflow patterns.

In one possible aspect, the first onion structure $O_d$ represents a sequence workflow pattern which can be described by the following formula:

$$O_d : \begin{cases} l_1 = \{SK_n\} \\ l_i = \left\{\{l_{i-1}\}_{PK_{pol_{n-i+2}}}, SK_{n-i+1}\right\} \text{ for } i \in [2, n] \\ l_{n+1} = \left\{\{l_n\}_{PK_{pol_1}}\right\} \end{cases}$$

wherein $l_j$ describes the j'th layer of the onion structure $O_d$, $SK_j$ describes the j'th vertex private key, and $PK_{pol_j}$ describes the j'th policy public key, wherein $j \in [1,n]$.

Alternatively, it is possible that the first onion structure $O_d$ represents a AND-SPLIT workflow pattern which can be described by the following formula:

$$O_{d_1} = \{SK_1, O_{d_2}, O_{d_3}, \ldots, O_{d_n}\}$$

$$O_{d_i} = \left\{\{SK_i\}_{PK_{pol_i}}\right\} \text{ for } i \in [2, n-1]$$

wherein $O_{d_j}$ describes an onion as part of the onion structure $O_d$, $SK_j$ describes the j'th vertex private key, and $PK_{pol_j}$ describes the j'th policy public key, wherein $j \in [1,n]$.

Furthermore, it is possible that the first onion structure $O_d$ represents a AND-JOIN workflow pattern which can be described by the following formula:

$$O_{d_1} = \left\{\{\lambda, SK_{n_1}\}_{PK_{pol_n}}\right\}$$

$$O_{d_i} = \left\{\{SK_{n_i}\}_{PK_{pol_n}}\right\} \text{ for } i \in [2n-1]$$

wherein $O_{d_j}$ describes an onion as part of the onion structure $O_d$, $PK_{pol_j}$ describes the j'th policy public key, the vertex private key $SK_n$ is divided into n−1 parts and defined by $SK_n = SK_{n_1} \oplus SK_{n_2} \oplus \ldots \oplus SK_{n_{n-1}}$, describes the onion structure, wherein $j \in [1, n-1]$.

The first onion structure $O_d$ can also represent a OR-SPLIT workflow pattern which can be described by the following formula;

$$O_{d_1} = \{SK_1, O_{d_2}, O_{d_3}, \ldots, O_{d_n}\}$$

$$O_{d_i} = \left\{\{SK_i\}_{PK_{pol_i}}\right\} \text{ for } i \in [2, n-1]$$

wherein $O_{d_j}$ describes an onion as part of the onion structure $O_d$, $PK_{pol_j}$ describes the j'th policy public key, and $SK_j$ describes the j'th vertex private key, wherein $j \in [1, n-1]$.

It is also possible that the first onion structure $O_d$ represents a OR-JOIN workflow pattern which can be described by the following formula:

$$O_d : \begin{cases} l_1 = \{\lambda, SK_n\} \\ l_2 = \left\{\{l_1\}_{PK_{pol_n}}\right\} \end{cases}$$

wherein $PK_{pol_n}$ describes the n'th policy public key, and $SK_n$ describes the n'th vertex private key, $\lambda$ describes the onion structure, and $l_1$ and $l_2$ layers of the onion structure $O_d$.

The first onion structure can also represent a combination of any of the above mentioned workflow patterns. It is possible that the first onion structure enabling the vertex private keys distribution during the execution of the workflow can represent a workflow pattern consisting of a plurality of different branches. Starting from the above mentioned basic workflow patterns the procedure towards building a first onion structure corresponding to a more complicated workflow pattern is rather straightforward and will be explained in more detail below.

According to a further aspect, the vertex key pairs are defined as follows: $i \in [1,n]$ $$\begin{cases} PK_i = h_1(W_{iid} \oplus S_W \oplus v_i) \\ SK_i = s \times h_2(PK_i) \end{cases}$$

wherein $s \in \mathbb{Z}_q^*$ for a prime q, s is called a master key held by the initiator server, $h_2$ is a second hash function, $W_{iid}$ is a string, called workflow instance identifier, $S_W$ denotes a workflow specification, $v_i$ is the i'th vertex, and the vertex key pairs $(PK_i, SK_i)$ are calculated upon creation of the workflow pattern.

In another aspect, there is provided a system configured to be used for a secure execution of workflow tasks of a workflow to be executed according to a given execution pattern within a decentralized network system, the system including at least an initiator server and a plurality of servers, each server satisfying a policy of a vertex of the workflow, and thus, knowing a corresponding policy key pair including a policy private key and a policy public key, respectively, wherein each vertex is assigned a vertex key pair including a vertex private key and a vertex public key, wherein an i'th server as at least one server which is to be determined at runtime of the workflow in accord with the execution pattern to perform one of the vertices of the workflow, the policy of which the i'th server satisfies, called herein the i'th vertex, is configured to perform at least the following operations:

receiving the first onion structure being built up of a number of onion layers representing the execution pattern with a most upper layer including the i'th vertex private key and being encrypted with the i'th policy public key, receiving the workflow originating from the initiator server and including workflow data encoded by the i'th vertex public key, decoding the i'th vertex private key by using the known i'th policy private key, and decoding the workflow data encoded by the i'th vertex public key from the received workflow by using the i'th vertex private key, executing the i'th vertex and processing the decoded workflow data accordingly, and updating the workflow according to the executed i'th vertex and the processed workflow data.

In still another aspect, a system is provided which is usable for a secure execution of workflow tasks of a workflow to be executed according to a given execution pattern within a decentralized network system with a plurality of servers. The system includes at least an initiator server and at least a number of groups of servers of the plurality of servers, each group satisfying a policy of a vertex, and thus, knowing a corresponding policy key pair including a policy private key and a policy public key, respectively. Each vertex denotes a set of workflow tasks to be executed in accord with the execution pattern and is assigned a vertex key pair including a vertex private key and a vertex public key. The vertex private keys and the policy public keys are jointly encrypted within a first onion structure, the first onion structure being built up of a number of onion layers representing the execution pattern which defines a succession of vertices such that each layer is decryptable by using the policy private key of exactly one vertex thus revealing the corresponding vertex private key. Thereby, an i'th server as at least one server of one of the groups of servers which is to be determined at runtime of the workflow in accord with the execution pattern to perform one of the vertices of the workflow, the policy of which the i'th server satisfies, called herein the i'th vertex, is configured to perform at least the following operations:

receiving the first onion structure with an outermost upper layer including the i'th vertex private key and being encrypted with the i'th policy public key, receiving the workflow originating from the initiator server and including workflow data encoded by the i'th vertex public key, decoding the i'th vertex private key by using the known i'th policy private key, and decoding the workflow data encoded by the i'th vertex public key from the received workflow by using the i'th vertex private key, executing the i'th vertex and processing the decoded workflow data accordingly, and updating the workflow according to the executed i'th vertex and the processed workflow data.

It is possible that the operation of updating the workflow comprises encoding at least the processed workflow data with the (i+1)'th vertex public key corresponding to the succession of vertices and adding those workflow data to the workflow, and that the i'th server is configured to further execute at least the following operation:

sending the updated workflow and the partly decoded first onion structure further to at least one (i+1)'th server as one server of the group of servers satisfying the policy of an (i+1)'th vertex as the next vertex in the succession of vertices.

It can be arranged that the i'th server is configured to choose the (i+1)'th server at runtime to execute the (i+1)'th vertex as the vertex following the i'th vertex in the succession of vertices.

As already mentioned with respect to the proposed method, it is also possible with respect to the system that the processed workflow data are included in a data block consisting of two fields, the processed workflow data that have last been modified during execution of the i'th vertex and a signature, and wherein the data block is associated with a set of signatures that is to be computed by the i'th server assigned to the i'th vertex at runtime.

The data block and the set of signatures can be determined according to the following formulas:

$$B_k^a = (d_k, \text{sign}_a(d_k))$$

$$\text{sign}_a(d_k) = \{h_1(d_k)\}_{SK_a}$$

wherein $d_k$ describes the actual data, $h_1$ a first hash function, and $SK_a$ the vertex private key of vertex a.

In one possible aspect of the system, the first onion structure is determined by the initiator server.

Furthermore, it is possible that, along with the execution of the workflow, a second onion structure is to be built at each execution step with vertex private keys based on the workflow execution pattern, the second onion structure being initialized by the initiator server, so that the i'th server can receive the second onion structure with (i−1) layers and can encrypt its upper layer with the i'th vertex private key to extend the second onion structure up to i layers which is to be sent to the (i+1)'th server upon completion of the i'th vertex.

It can be provided that the i'th server can send a workflow message to the (i+1)'th server upon execution of the i'th vertex and updating of the workflow, the workflow message including the updated workflow, the first onion structure and the extended second onion structure so that the (i+1)'th server can first retrieve the (i+1)'th vertex private key from the first onion structure, can verify compliance of the workflow execution with the workflow pattern using the extended second onion structure and finally can execute the (i+1)'th vertex and process the workflow data accordingly.

Further it can be established that the second onion structure is to be initiated by the initiator server who can compute the first layer as the most inner layer by determining a hash value of a workflow policy using the first hash function and encoding the hash value by the policy private key of the first vertex according to the succession of vertices.

Thereby, it is possible that the workflow policy is to be defined by the initiator server.

It can also be determined that each vertex key pair assigned to exactly one vertex is to be defined for a single instance of the workflow so that it cannot be reused during any other workflow instance.

As already mentioned above, the first onion structure can represent a wide variety of different workflow patterns. There are some basic workflow patterns, such as a sequence workflow pattern, an AND-SPLIT workflow pattern, an AND-JOIN workflow pattern, an OR-SPLIT workflow pattern and an OR-JOIN workflow pattern, which can also be combined to form much more complex workflow patterns.

According to another aspect, an initiator server for initiating a secure execution of workflow tasks of a workflow to be executed according to a given execution pattern within a decentralized network system with a plurality of servers is provided. The system includes at least a number of groups of servers of the plurality of servers, each group satisfying a policy of a vertex, and thus, knowing a corresponding policy key pair including a policy private key and a policy public key, respectively, wherein each vertex denotes a set of workflow tasks to be executed in accord with the execution pattern and is assigned a vertex key pair including a vertex private key and a vertex public key. The proposed initiator server is configured to encrypt the vertex private keys and the policy public keys jointly within a first onion structure, wherein the first onion structure is built up of a number of onion layers representing the execution pattern which defines a succession of vertices such that each layer is decryptable by using the policy private key of exactly one vertex thus revealing the corresponding vertex private key. The initiator server is further configured to determine at least one server of one of the groups of servers at runtime of the workflow in accord with the execution pattern to perform one of the vertices of the workflow.

The initiator server can be one server of at least one of the groups of servers, each group satisfying a policy of a vertex.

The initiator server can further be configured to initialize, along with the execution of the workflow, a second onion structure which is to be extend at each execution step with vertex private keys based on the workflow execution pattern, so that the i'th server can receive the second onion structure with (i−1) layers and can encrypt its upper layer with the i'th vertex private key to extend the second onion structure up to i layers which is to be sent to the (i+1)'th server upon completion of the i'th vertex.

It is also possible that the initiator server can initialize the second onion structure by computing the first layer as the most inner layer by determining a hash value of a workflow policy using the first hash function and encoding the hash value by the policy private key of the first vertex according to the succession of vertices.

Furthermore, it is possible that the initiator server is configured to define the workflow policy.

In another aspect, a computer program product is provided with a computer-readable medium and a computer program stored on the computer-readable medium with a program code which is suitable for carrying out a method for securely executing workflow tasks in a distributed workflow management system within a decentralized network system as described before when the computer program is run on a computer.

Another implementation provides a computer program with a program code which is suitable for carrying out a method for securely executing workflow tasks in a distributed workflow management system within a decentralized network system as described before when the computer program is run on a computer.

A computer-readable medium with a computer program stored thereon is also provided, the computer program comprising a program code which is suitable for carrying out a method for securely executing workflow tasks in a distributed workflow management system within a decentralized network system as described before when the computer program is run on a computer.

Further features and embodiments will become apparent from the description and the accompanying drawings.

For the purpose of clarity, the present discussion refers to an abstract example of a method, a system and an initiator server, respectively. However, implementations of the method, the system and the initiator server may operate with a wide variety of types of network systems including networks and communication systems dramatically different from the specific example as illustrated in the following drawings.

It should be understood that while details of one or more implementations are described in terms of a specific system, further implementations may have applications in a variety of communication systems, such as advanced cable-television systems, advanced telephone-networks or any other communication systems that would benefit from the system or the method. It is intended that the system as used in this specification and claims is realizable within any communication system unless the context requires otherwise.

Implementations are schematically illustrated in the drawings by way of an example embodiment and explained in detail with reference to the drawings. It is understood that the description is in no way limiting and is merely an illustration of various implementations.

It will be understood that the features mentioned above and those described hereinafter can be used not only in the combination specified but also in other combinations or on their own, without departing from the scope of the present disclosure.

BRIEF DESCRIPTION OF THE DRAWINGS

In the drawings,

FIG. 7 is a block diagram of a workflow massage structure.

DETAILED DESCRIPTION

A workflow management system was designed in F. Montagut and R. Molva. Enabling pervasive execution of workflows. In Proceedings of the $i^{st}$ IEEE International Conference on Collaborative Computing: Networking, Applications and Worksharing, CollaborateCom, 2005. and is used to support the following description. This model introduces a workflow management system supporting the execution of business processes in environments without infrastructure. This workflow management system features a distributed architecture characterized by two objectives:

1. Fully decentralized architecture: the workflow management task is carried out by a set of devices in order to cope with the lack of dedicated infrastructure.
2. Dynamic assignment of servers to workflow tasks: the actors can be discovered at runtime.

Having designed an abstract representation of the workflow in form of a workflow pattern whereby servers, also designated as business partners, are not yet assigned to workflow tasks, an initiator server launches the execution and executes a first set of workflow tasks. Then the initiator server searches for a server able to perform a next set of workflow tasks. Once the discovery phase is complete, a workflow message including all workflow data is sent by the workflow initiator server, also called initiator server, to the newly discovered server and the workflow execution further proceeds with the execution of the next set of workflow tasks and a new discovery procedure. The execution pattern is stateless so that upon completion of required workflow tasks each server sends all workflow data to the next server involved and thus does not have to remain online till the end of the workflow execution. In this decentralized setting, the data transmitted amongst servers include all workflow data. W denotes in the following the abstract representation of a distributed workflow defined by $W=\{(v_i)_{i\in[1,n]},\delta\}$ where $v_i$ denotes a vertex which is a set of workflow tasks that are performed by a server $b_i$ assigned to $v_i$ and $\delta$ is the set of execution dependencies between those vertices.

$$(M_{i\to j_p})_{p\in[1,z_i]}$$

is noted as a set of workflow messages issued by $b_i$ to the $z_i$ servers assigned to the vertices $$(v_{j_p})_{p\in[1,z_i]}$$

executed right after the completion of $v_i$. An instance of W wherein servers have been assigned to vertices is denoted $W_b=\{W_{iid},(b_i)_{i\in[1,n]}\}$, where $W_{iid}$ is a string called workflow instance identifier.

Figure 1:
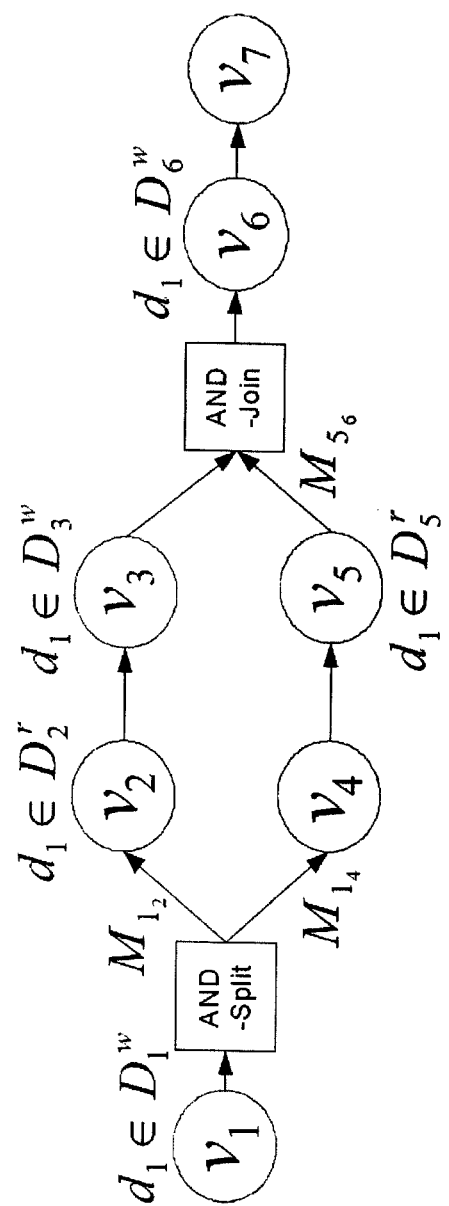
FIG. 1 is a block diagram showing an example for a workflow, comprising a sequence-, an AND-Split- and an AND-JOIN-workflow pattern.

This model is depicted in FIG. 1. The present description only mentions a subset of execution dependencies or workflow patterns, namely sequence workflow patterns, AND-SPLIT workflow patterns, AND-JOIN workflow patterns, OR-SPLIT workflow patterns and OR-JOIN workflow patterns. A variety of other workflow patterns or combinations thereof are also possible.

FIG. 1 shows a possible workflow execution pattern. There are seven vertices $v_1$ to $v_7$ to be executed according to the given execution pattern. Each vertex $v_i$ is assigned to a server $b_i$ which has to execute the vertex $v_i$ when appealed for in accord with the execution pattern. Upon execution of vertex $v_1$, servers $b_2$ and $b_4$ assigned to vertices $v_2$ and $v_4$, respectively, are contacted concurrently by $b_1$ assigned to $v_1$ as indicated by the bifurcation "AND-Split". Server $b_2$ contacts server $b_3$ assigned to vertex $v_3$ upon execution of vertex $v_2$. Server $b_4$ executes vertex $v_4$ and contacts then server $b_5$ assigned to vertex $v_5$. Vertex $v_6$ is executed by server $b_6$ if server $b_6$ receives a message form server $b_3$ upon execution of $v_3$ and a further message from server $b_5$ upon execution of $v_5$ as indicated by block "AND-Join". The workflow is terminated by server $b_7$ assigned to vertex $v_7$ which is contacted by server $b_6$ upon execution of vertex $v_6$.

Such a distributed execution of workflows raises security constraints due to the lack of dedicated infrastructure assuring the management and control of the workflow execution. As a result, basic security features such as compliance of the workflow execution with the predefined plan are no longer assured so far.

Three main categories of security requirements for a distributed workflow system are: authorization, proof of execution and workflow data protection.

Concerning authorization, the main security requirement for a workflow management system is to ensure that only authorized servers are assigned to workflow tasks throughout a workflow instance. In the decentralized setting, the assignment of workflow tasks is managed by servers themselves relying on a service discovery mechanism in the case of runtime assignment. In this case, the server assignment procedure enforces a matchmaking procedure whereby the security credentials for the servers are matched against security requirements for workflow tasks.

Concerning execution proofs, a decentralized workflow management system does not offer any guarantee regarding the compliance of actual execution of workflow tasks with the predefined execution plan. Without any trusted coordinator to refer to, a server $b_i$ assigned to a vertex $v_i$ needs to be able to verify that the vertices scheduled to be executed beforehand were actually executed according to the workflow pattern. This is a crucial requirement to prevent any malicious peer from forging a workflow instance.

A need for workflow data protection occurs particularly in the case of decentralized workflow execution, wherein the set of workflow data denoted $D=(d_k)_{k\in[1,y]}$ is transferred from one server to another. This raises major requirements for workflow data security in terms of integrity, confidentiality and access control as follows:

1. Data confidentiality: for each vertex $v_i$, the server $b_i$ assigned to $v_i$ should only be authorized to read a subset $D_i^r$ of D. In the example of FIG. 1 server $b_2$ assigned to $v_2$ and server $b_5$ assigned to $v_5$ are only authorized to read $d_1$, respectively, as indicated by the fact that $d_1 \in D_2^r$; and $d_1 \in D_5^r$, respectively.
2. Data integrity: for each vertex $v_i$, the server $b_i$ assigned to $v_i$ should only be authorized to modify a subset $D_i^w$ of D. In the example of FIG. 1 server $b_1$ assigned to $v_1$ is authorized to modify $d_1$ since $d_1 \in D_1^w$. The same applies for server $b_3$ assigned to $v_3$ and server $b_6$ assigned to $v_6$.
3. Access control: the subsets $D_i^r$ and $D_i^w$ associated with each vertex $v_i$ should be determined based on the security policy of the workflow.

Therefore, according to one proposed approach two types of key pairs are introduced. Each vertex $v_i$ is first associated with a policy $pol_i$ defining a set of credentials a candidate server needs to satisfy in order to be assigned to $v_i$. The policy $pol_i$ is mapped to a key pair $(PK_{pol_i}, SK_{pol_i})$, where $SK_{pol_i}$ is the policy private key and $PK_{pol_i}$ the policy public key. Thus satisfying the policy $pol_i$ is equivalent to knowing the policy private key $SK_{pol_i}$. The policy private key $SK_{pol_i}$ can be distributed by a single key distribution server based on the compliance of servers with policy $pol_i$ or by means of a more sophisticated cryptographic scheme such as group key distribution. Second, vertex key pairs $(PK_i, SK_i)_{i \in [1,n]}$ are introduced to protect the access to workflow data. A key distribution scheme is suggested wherein a server $b_i$ whose identity is a priori unknown retrieves the vertex private key $SK_i$ upon his assignment to the vertex $v_i$. Onion encryption techniques with policy public keys $PK_{pol_i}$ are used to distribute vertex private keys $SK_i$.

Figure 2:
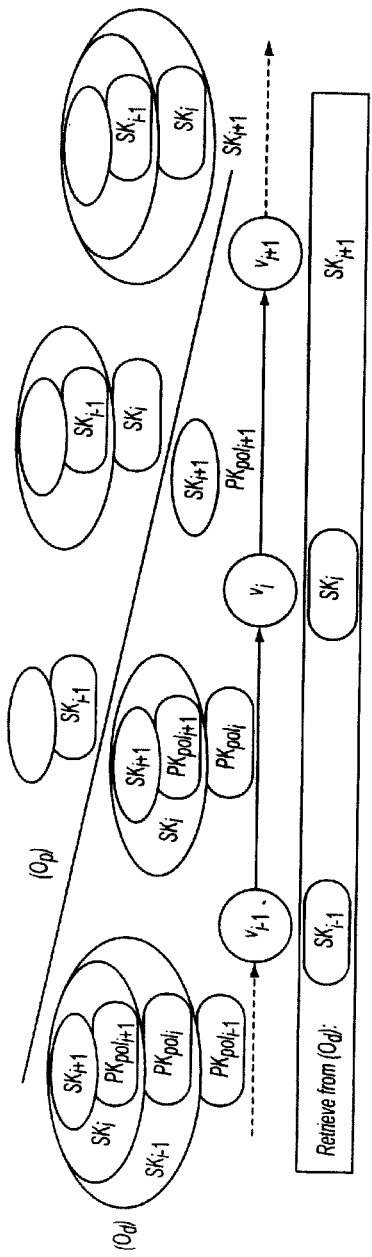
FIG. 2 is showing the principle of a first onion structure, namely a key distribution scheme $O_d$ and a second onion structure, namely an execution proof mechanism $O_p$.

Furthermore, execution proofs have to be issued along with the workflow execution in order to ensure the compliance of the execution with the pre-defined plan. To that effect, onion encryption techniques are introduced in order to built an onion structure with vertex private keys to assure the integrity of the workflow execution. The suggested key distribution scheme ($O_d$) and the execution proof mechanism ($O_p$) are depicted in FIG. 2 and specified in more detail later on. In the following $\mathcal{M}$ denotes a message space, C a ciphertext and K a key space. An encryption of a message $m \in \mathcal{M}$ with a key $K \in \mathbb{K}$ is noted $\{m\}_i$ and $h_1$, $h_2$ denote a first and a second one-way hash function.

FIG. 2 clearly shows the principle according to which a first onion structure $O_d$ and a second onion structure $O_p$ are transported, updated and processed between servers $b_i$, each server $b_i$ being assigned to a respective vertex $v_i$ which he has to execute according to a given execution pattern. The two onion structures are generally included in the messages which are transported between the servers. In FIG. 2 the two onion structures are illustrated due to clarity separately from one another. In the case shown in FIG. 2 the messages are transported sequentially between servers $b_{i-1}$, $b_i$ and $b_{i+1}$. Server $b_{i-1}$ which is assigned to vertex $v_{i-1}$ receives the message including the first onion structure $O_d$. The server $b_{i-1}$ peels off the first onion structure $O_d$ by using the policy public key $PK_{pol_{i-1}}$. By decrypting the outermost layer of the first onion structure $O_d$ server $b_{i-1}$ can retrieve the vertex private key $SK_{i-1}$. By means of the vertex private key $SK_{i-1}$ server $b_{i-1}$ can get access to workflow data which he received from server $b_{i-2}$ upon execution of vertex $v_{i-2}$ right before vertex $v_{i-1}$. Along with the workflow execution the second onion structure $O_p$ is built at each execution step with the appropriate vertex private key in order to allow servers to verify the integrity of the workflow execution. The second onion structure $O_p$ is initialized by the initiator server who computes the most inner layer. Thereby, a public parameter is computed by the workflow initiator server and that is available to the servers being involved in the execution of the workflow. The second onion structure $O_p$ is initialized this way so that it cannot be replayed as it is defined for a specific instance of a workflow specification. At step i–1 of the workflow execution server $b_{i-1}$ receives $O_{p_{i-2}}$ and encrypts its upper layer with the vertex private key $SK_{i-1}$ to build an extended second onion structure $O_{p_{i-1}}$ which he sends further to server $b_i$ upon completion of vertex $v_{i-1}$ as indicated in the upper part of FIG. 2. The next server $b_i$ assigned to vertex $v_i$ receives now the first onion structure $O_d$ partly peeled off up to the onion layer which is encoded by the policy public key $PK_{pol_i}$. Server $b_i$ assigned to $v_i$ knows the policy private key $SK_{pol_i}$ since server $b_i$ satisfies the policy $pol_i$ of the vertex $v_i$. Therefore, server $b_i$ can retrieve from the first onion structure $O_d$ the vertex private key $SK_i$ by using the policy private key $SK_{pol_i}$. As already described with respect to the previous server $b_{i-1}$ server $b_i$ can use the vertex private key $SK_i$ to decode the workflow data he has to process during execution of vertex $v_i$ and also to encrypt the upper layer of the second onion structure $O_p$ with $SK_i$ to build an updated second onion structure $O_p$, namely by building a next layer $O_{p_i}$ so that he can send the extended second onion structure $O_p$ to the next server $b_{i+1}$ together with the updated workflow data and the first onion structure $O_d$ partly peeled off up to the next inner layer which is encoded by the policy public key $PK_{pol_{i+1}}$. Server $b_{i+1}$ can now retrieve from the first onion structure $O_d$ the vertex private key $SK_{i+1}$ by using the policy private key $SK_{pol_{i+1}}$. The vertex private key $SK_{i+1}$ can again be used to decode the encrypted workflow data and also to update the second onion structure $O_p$ by building the next onion layer $O_{p_{i+1}}$ as indicated in the upper part of FIG. 2.

Figure 3:
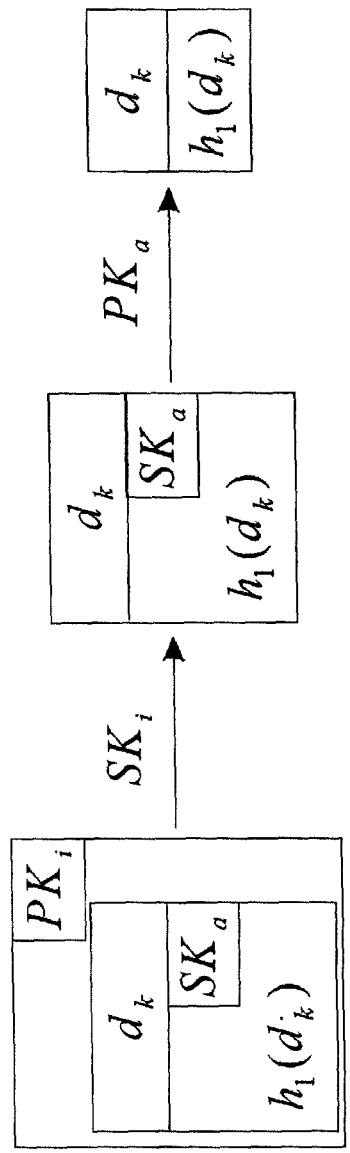
FIG. 3 is a block diagram of the accessibility to workflow data, stored within a specific data block.

Concerning the data protection, the role of a server $b_i$ assigned to a vertex $v_i$ consists in processing the workflow data that are granted read-only and read-write access during the execution of vertex $v_i$. In FIG. 3 a specific structure is depicted called data block to protect workflow data accordingly. Each data block consists of two fields: the actual data $d_k$ and a signature $sign_a(d_k) = \{h_1(d_k)\}_{SK_a}$. The data block is denoted as $B_k^a = (d_k, sign_a(d_k))$ including a data segment $d_k$ that has last been modified during the execution of vertex $v_a$. The data block $B_k^a$ is also associated with a set of signatures denoted $H_k^a$ that is computed by $b_a$ assigned to $v_a$.

$$H_k^a = \left\{ \{h_1(\{B_k^a\}_{PK_l})\}_{SK_a} \mid l \in R_k^a \right\}$$

where $R_k^a$ denotes the set defined by $R_k^a = \{l \in [1,n] | (d_k \in D_l^r - D_l^w)$ and $(v_l$ is executed after $v_a)$ and $(v_l$ is executed before the first vertex $v_{p_a}$ following $v_a$ such that $d_k \in D_{p_a}^w$ and that is located on the same branch of the workflow as $v_a$ and $v_l)\}$. For instance, consider the example of FIG. 1 whereby $d_1$ belongs to $D_1^w, D_2^r, D_3^w, D_5^r$ and $D_6^w$, $R_1^1 = \{2, 5\}$.

When a server $b_i$ receives the data block $B_k^a$ encrypted with $PK_i$ (i.e. he is granted read access on $d_k$), he decrypts the structure using $SK_i$ in order to get access to $d_k$ and $sign_a(d_k)$. $b_i$ is then able to verify the integrity of $d_k$ using $PK_a$ i.e. that $d_k$ was last modified after the execution of vertex $v_a$. Further, if $b_i$ is granted write access on $d_k$, he can update the value of $d_k$ and compute $sign_i(d_k)$ yielding a new data block $B_k^i$ and a new set $H_k^i$. If on the contrary server $b_i$ receives data block $B_k^a$ encrypted with $PK_m$, whereby in this case vertex $v_m$ is executed after $v_i$, $b_i$ can verify the integrity of $\{B_k^a\}_{PK_m}$ by matching $h_1(\{B_k^a\}_{PK_m})$ against the value contained in $H_k^a$.

The integrity and confidentiality of data access thus relies on the fact that the vertex private key $SK_i$ is made available to server $b_i$ only prior to the execution of vertex $v_i$.

The objective of the vertex private key distribution mechanism is to ensure that only a server $b_i$ assigned to $v_i$ at runtime and whose identity is a priory unknown can access the vertex private key $SK_i$. The basic idea behind this mechanism is to map the workflow structure in terms of execution patterns with an onion structure $O_d$ so that at each step of the workflow execution a layer of $O_d$ is peeled off using $SK_{pol_i}$ and $SK_i$ is revealed.

When X is a set, an onion O is a multi-layered structure composed of a set of n subsets of X $(l_k)_{k \in [1,n]}$ such that $\forall k \in [1,n] l_{k+1} \subseteq l_k$. The elements of $(l_k)_{k \in [1,n]}$ are called layers of O, in particular, $l_1$ and $l_n$ are the lowest and upper layers of O, respectively. $l_p(O)$ is the layer p of an onion O.

When $A=(\alpha_k)_{k \in [1,j]}$ and $B=(b_k)_{k \in [1,l]}$ are two onion structures, A is said to be wrapped by B, denoted $A \subset B$ when $\exists k \in [1,l]$ such that $a_j \subseteq b_k$. The vertex private keys are distributed to servers with respect to various workflow patterns including SEQUENCE, AND-SPLIT, AND-JOIN, OR-SPLIT and OR-JOIN being defined as follows.

Using the sequence workflow pattern the vertex private keys are sequentially distributed to servers. In this case, an onion structure assuring the distribution of vertex private keys is sequentially peeled off by servers. Considering a sequence of n vertices $(v_i)_{i \in [1,n]}$, $b_1$ assigned to $v_1$ initiates the workflow execution with the onion structure $O_d$ defined as follows.

$$O_d: \begin{cases} l_1 = \{SK_n\} \\ l_i = \left\{\{l_{i-1}\}_{PK_{pol_{n-i+2}}}, SK_{n-i+1}\right\} \text{ for } i \in [2, n] \\ l_{n+1} = \left\{\{l_n\}_{PK_{pol_1}}\right\} \end{cases}$$

Figure 4:
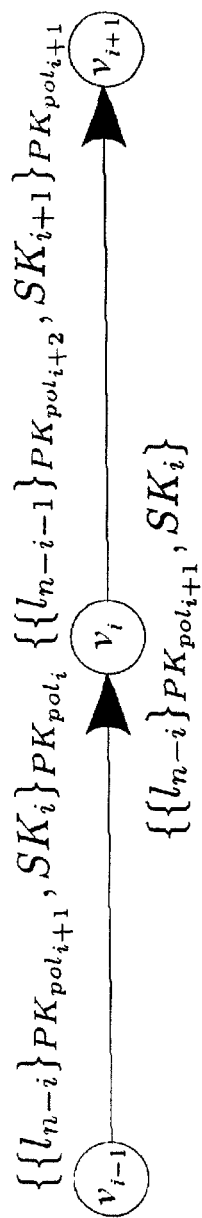
FIG. 4 is a block diagram of a sequence workflow pattern.

The workflow execution further proceeds as depicted in FIG. 4. For $i \in [2,n-1]$ the server $b_i$ assigned to the vertex $v_i$ receives $$\{l_{n-i+1}(O_d)\}_{PK_{pol_i}},$$

peels one layer off by decrypting it using $SK_{pol_i}$, reads $l_{n-i+1}(O_d)$ to retrieve $SK_i$ and sends $\{l_{n-i}(O_d)\}PK_{pol_{i+1}}$ to $b_{i+1}$.

Figure 5:
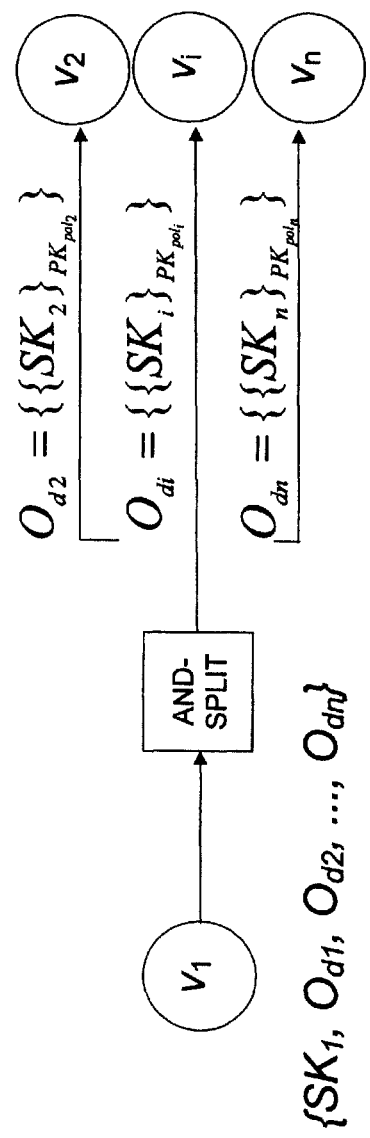
FIG. 5 is a block diagram of an AND-SPLIT workflow pattern.

In the case of an AND-SPLIT workflow pattern, the servers $(b_i)_{i \in [2,n]}$ assigned to the vertices $(v_i)_{i \in [2,n]}$ are contacted concurrently by $b_1$ assigned to the vertex $v_1$. In this case, n-1 vertex private keys should be delivered to $(b_i)_{i \in [2,n]}$ and the upper layer of the onion $O_{d1}$ available to $b_1$ therefore wraps $SK_1$ and n-1 onions $(O_{di})_{i \in [2,n]}$ to be sent to $(b_i)_{i \in [2,n]}$ as depicted in FIG. 5.

$$O_d = \{SK_1, O_{d2}, O_{d3} \ldots, O_{dn}\}$$

$$O_{di} = \left\{\{SK_i\}_{PK_{pol_i}}\right\} \text{ for } i \in [2, n-1]$$

Figure 6:
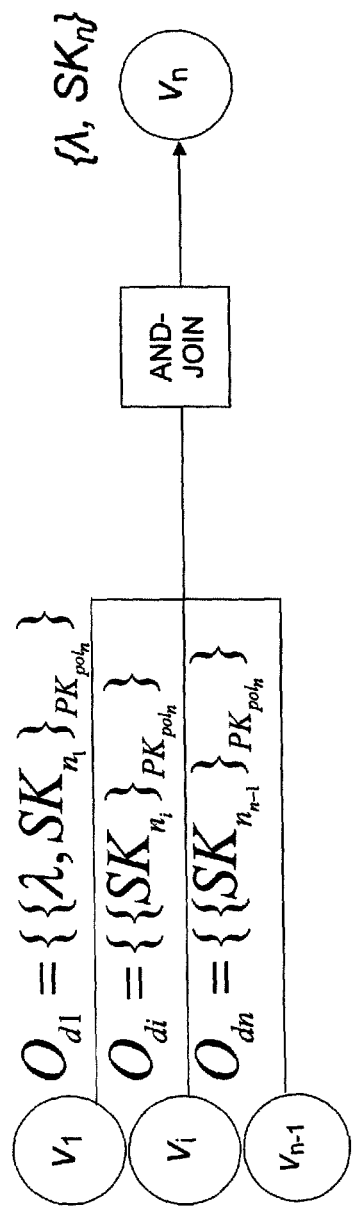
FIG. 6 is a block diagram of an AND-JOIN workflow pattern.

In the case of a single workflow initiator, an AND-JOIN workflow pattern is preceded in the workflow by an AND-SPLIT workflow pattern. In this case, the vertex $v_n$ is executed by the server $b_n$ if and only if the latter receives n-1 messages as depicted in FIG. 6. The vertex private key $SK_n$ is thus divided into n-1 parts and defined by $SK_n = SK_{n_1} \oplus SK_{n_2} \oplus \ldots \oplus SK_{n_{n-1}}$. The onion $O_{di}$ sent by $b_i$ thus includes $SK_{n_i}$. Besides, in order to avoid redundancy, the onion structure $\delta$ associated with the sequel of the workflow execution right after $v_n$ is only included in one of the onions received by $b_n$. Each $(b_i)_{i \in [1,n-1]}$ therefore sends $O_{di}$ to $b_n$ where $$O_{d1} = \left\{\{\lambda, SK_{n_1}\}_{PK_{pol_n}}\right\}$$

$$O_{di} = \left\{\{SK_{n_j}\}_{PK_{pol_n}}\right\} \text{ for } i \in [2, n-1]$$

The OR-SPLIT workflow pattern is an exclusive choice, $v_1$ sends one message to an appropriate participant.

$$O_{d1} = \{SK_1, O_{d2}, O_{d3}, \ldots, O_{dn}\}$$

$$O_{di} = \left\{\{SK_i\}_{PK_{pol_i}}\right\} \text{ for } i \in [2, n-1]$$

$O_{d1}$ is available to the server assigned to $v_1$. This is the same structure as the AND-SPLIT workflow pattern, yet the latter only sends the appropriate $O_{di}$ to $v_i$ depending on the result of the OR-SPLIT condition.

In an OR-JOIN workflow pattern, there is a single workflow initiator server. Therefore, the OR-JOIN is preceded in the workflow by an OR-SPLIT workflow pattern. The server assigned to $v_n$ receives in any cases a single message thus a single vertex private key is required that is sent by one of the $(b_i)_{[1,n-1]}$ depending on the choice made of the previous OR-SPLIT in the workflow. $b_n$ thus receives in any cases:

$$O_d: \begin{cases} l_1 = \{\lambda, SK_n\} \\ l_2 = \left\{\{l_1\}_{PK_{pol_n}}\right\} \end{cases}$$

where $\delta$ is an onion structure associated with the sequel of the workflow execution right after $v_n$.

The key distribution is processed by building an onion structure corresponding to the workflow execution pattern. This is rather straightforward and better sketched throughout an example according to the workflow depicted in FIG. 1. The onion $O_d$ enabling the vertex private keys distribution during the execution of the workflow is defined as follows:

$$O_d = \{ \{SK_1, \{SK_2, \{SK_3, \overbrace{\{SK_{6_1}, \{SK_7\}}^{\text{sequel after } v_6} PK_{pol_7}},$$

First AND-SPLIT branch $$\underbrace{\}_{PK pol_6} \}_{PK pol_3} \}_{PK pol_2}}_{\text{First AND-SPLIT branch}}, \underbrace{\{SK_4, \{SK_5, \{SK_{6_2}}_{\text{Second AND-SPLIT branch}}$$

$$\underbrace{\}_{PK pol_6} \}_{PK pol_5} \}_{PK pol_4}}_{\text{Second AND-SPLIT branch}} \}_{PK pol_1} \}$$

The onions associated with the two branches forming the AND-SPLIT workflow pattern are wrapped by the layer corresponding to $v_1$. Only the first AND-SPLIT branch includes the sequel of the workflow after $v_6$.

For creation of an execution proof along the workflow execution, an onion structure $O_{p_i}$ is built at each execution step i with vertex private keys in order to allow servers to verify the integrity of the workflow execution. The onion structure $O_p$ is initialized by the server $b_1$ assigned to $v_1$ who computes $$O_{p1} = \{h_1(P_W)\}_{SK_{pol_1}}$$

where $P_W$ is called workflow policy and is defined as follows. A workflow specification $S_W$ denotes the set $S_W = \{W, (J_i^r, J_i^w, pol_i)_{i \in [1,n]}, h_1\}$ where $J_i^r = \{k \in [1,j] | d_k \in D_i^r\}$ and $J_i^w = \{k \in [1,j] | d_k \in D_i^w\}$ ($J_i^r$ and $J_i^w$ basically specify for each vertex the set of data that are granted read-only and read-write access, respectively). $S_W$ is defined at workflow design phase.

The workflow policy $P_W$ denotes the set $P_W = S_W \cup \{W_{iid}, h_2\} \cup \{PK_i | i \in [1,n]\}$, wherein $P_W$ is a public parameter computed by the workflow initiator server $b_1$ and that is available to the servers being involved in the execution of the workflow W.

The onion structure $O_p$ is initialized this way so that it cannot be replayed as it is defined for a specific instance of a workflow specification. At the step i of the workflow execution, $b_i$ receives $O_{p_{i-1}}$ and encrypts its upper layer with $SK_i$ to build an onion $O_{p_i}$ which he sends to $b_{i+1}$ upon completion of $v_i$. Considering a set $(v_i)_{[1,n]}$ of vertices executed in sequence the following definitions are resulting:

$$O_{p_1} : l_1 = \left\{\{h_1(P_W)\}_{SK_{pol_1}}\right\}$$

$$O_{p_2} : l_1 = \left\{\{l_1(O_{p_1})\}_{SK_2}\right\}$$

$$O_{p_i} : l_1 = \left\{\{l_1(O_{p_{i-1}})\}_{SK_i}\right\} \text{ for } i \in [3, n]$$

The building process of $O_{p_i}$ is based on workflow execution patterns yet since it is built at runtime contrary to the onion structure $O_d$, this is straightforward. First, there is no specific rule for OR-SPLIT and OR-JOIN workflow patterns. Second, when encountering an AND-SPLIT workflow pattern, the same structure $O_{p_i}$ is concurrently sent while in case of an AND-JOIN workflow pattern, the n−1 onions received by a server $b_n$ are wrapped by a single structure:

$$O_{p_n} : l_1 = \{\{O_{p_1}, O_{p_2}, \ldots, O_{p_{n-1}}\}_{SK_n}\}.$$

In order to verify that the workflow execution is compliant with the pre-defined plan when he starts the execution of the vertex $v_i$ the server $b_i$ assigned to $v_i$ just peels off the layers of $O_{p_{i-1}}$ using the vertex public keys of the vertices previously executed based on $S_W$. Doing so he retrieves the value $$\{h_1(P_W)\}_{SK_{pol_1}}$$

that should be equal to the one he can compute given $P_W$, if the workflow execution has been so far executed according to the plan.

Considering the example depicted in FIG. 1, at the end of the workflow execution the onion $O_p$ is defined as follows.

$$O_p = \left\{\left\{\left\{\underbrace{\left\{\{h_1(P_W)\}_{SK_{pol_1}}\right\}_{SK_2}\right\}_{SK_3}}_{\text{First AND-SPLIT branch}}, \underbrace{\left\{\left\{\{h_1(P_W)\}_{SK_{pol_1}}\right\}_{SK_4}\right\}_{SK_5}\right\}_{SK_6}}_{\text{Second AND-SPLIT branch}}\right\}_{SK_7}\right\}$$

$$\{h_1(P_W)\}_{SK_{pol_1}}$$

is sent by $b_1$ assigned to $v_1$ to both $b_2$ and $b_4$ assigned to $v_2$ and $v_4$ respectively. The onion structure associated with the two branches forming the AND-SPLIT workflow pattern thus includes $$\{h_1(P_W)\}_{SK_{pol_1}}$$

twice.

The vertex key pairs have to be generated and defined for a single instance of a workflow specification in order to avoid replay attacks. To that effect, it might be proposed to capitalize on ID-based encryption techniques, in the specification of the set $(PK_i, SK_i)_{i \in [1,n]}$. For all $i \in [1,n]$ $(PK_i, SK_i)$ is defined by:

$$\begin{cases} PK_i = h_1(W_{iid} \oplus S_W \oplus v_i) \\ SK_i = s \times h_2(PK_i) \end{cases}$$

where $s \in \mathbb{Z}_q^*$ for a prime q. s is called master key and is held by the private vertex keys generator which is in this case the workflow initiator server. This vertex key pair specification has a double advantage. First vertex key pairs cannot be reused during any other workflow instance and second vertex public keys can be directly retrieved from W and $W_{iid}$ when verifying the integrity of workflow data or peeling off the second onion structure $O_p$.

Figure 7:
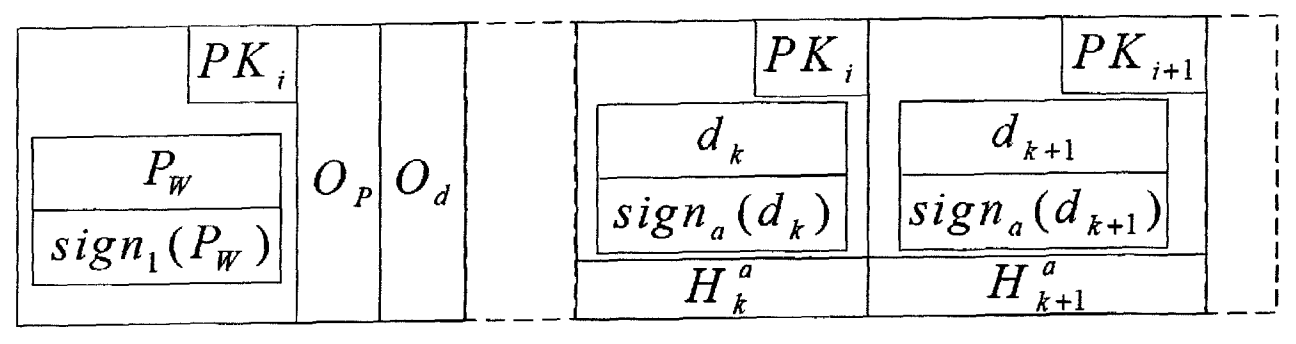

In order to support a coherent execution of the mechanisms presented so far, workflow messages exchanged between servers consist of the set of information that is depicted in FIG. 7. Workflow data $(d_k)_{k \in [1,j]}$ are all transported between servers and satisfy the data block specification. A single message may include several copies of the same data block structure that are encrypted with different vertex public keys based on the execution plan. This can be the case with AND-SPLIT workflow patterns. Besides, workflow data can be stored in two different ways depending on the requirements for the execution of the workflow. Either the iterations of data resulting from each modification in workflow messages is kept till the end of the execution or the data content is simply replaced upon completion of a vertex. The bandwidth requirements are higher in the first case since the size of messages increases as the workflow execution proceeds further.

$P_W$ is required to retrieve vertex and policy public keys and specifies the workflow execution plan. The two onion structures, namely the first onion structure $O_d$ and the second onion structure $O_p$, are also included in the message.

Upon receipt of the message depicted in FIG. 7 a server $b_1$ assigned to $v_1$ retrieves first the vertex private key from the first onion structure $O_d$. He then checks that $P_W$ is genuine i.e. that it was initialized by the initiator server of the workflow assigned to $v_1$. He is later on able to verify the compliance of the workflow execution with the plan using the second onion structure $O_p$ and finally he can process workflow data.

The mechanisms presented so far can be combined to support the secure execution of the workflow in the decentralized setting.

Integrating security mechanisms to enforce the security requirements of the decentralized workflow execution requires a process strongly coupled with both workflow design and runtime specifications. At the workflow design phase, the workflow specification $S_W$ is defined in order to specify for each vertex the sets of data that are accessible in read and write access and the credentials required by potential servers to be assigned to workflow vertices. At workflow initiation phase, the workflow policy $P_W$ is specified and the first onion structure $O_d$ is built. The workflow initiator server builds then the first set of workflow messages to be sent to the next servers involved. This message generation process consists of the initialization of the data blocks and that of the second onion structure $O_p$.

At runtime, a server $b_i$ chosen to execute a vertex $v_i$ receives a set of workflow messages. Those messages are proceeded to retrieve $SK_i$ from the first onion structure $O_d$ and to access workflow data. Once the vertex execution is complete $b_i$ builds a set of workflow messages to be dispatched to the next servers involved in the execution. In this message building process, the data and the second onion structure $O_p$ are updated.

The set of functional operations composing the workflow initiation and runtime specifications is precisely specified later. In the following $N_k^i$ denotes a set defined by $N_k^i = \{l \in [1, n] | d_k \in D_l^r$ and $v_l$ is executed right after $v_i\}$. considering the example of FIG. 1: $d_1$ is accessed during the execution of the vertices $v_1$, $v_2$ and $v_5$ thus $N_1^1 = \{2, 5\}$.

Figure 8:
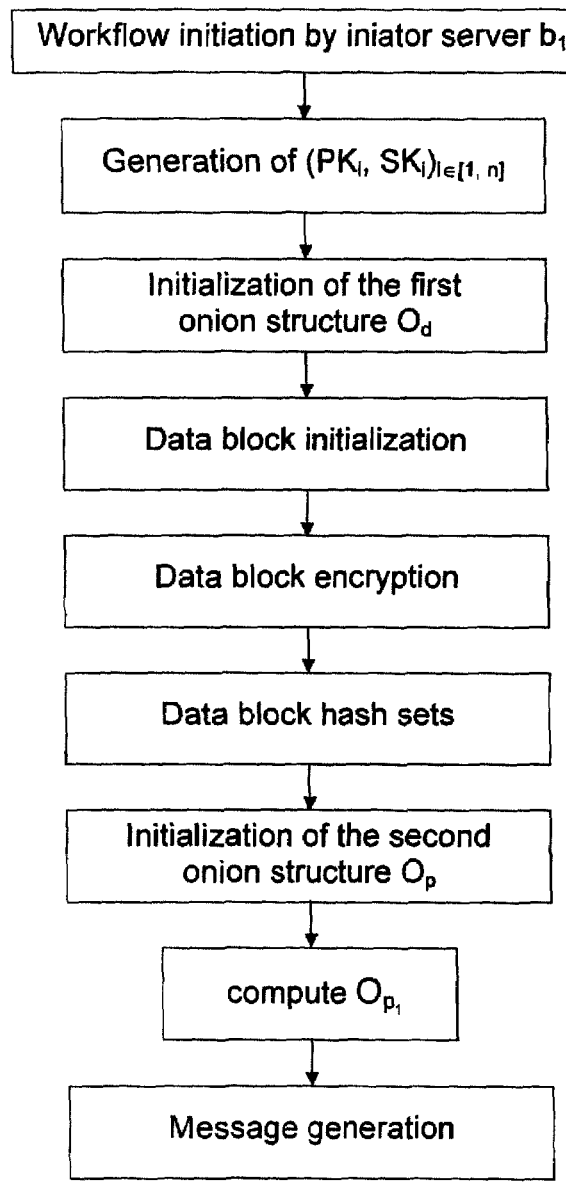
FIG. 8 shows a sequence of operations for a workflow initiation.

FIG. 8 shows a sequence of operations for a workflow initiation. The workflow is initiated by initiator server $b_1$ assigned to vertex $v_1$ who issues a first set of workflow messages $$\left(M_{1 \rightarrow j_p}\right)_{p \in [1, z_1]}.$$

The workflow initiation consists of the following operations:
1. Workflow policy specification: generate $(PK_i, SK_i)_{i \in [1, n]}$
2. Initialization of the first onion structure $O_d$
3. Data block initialization: compute $\forall k \in [1, j] \text{sign}_1(d_k)$
4. Data block encryption: $\forall k \in [1, j]$ determine $N_k^1$ and compute $\forall k \in [1, j], \forall l \in N_k^1 \{B_k^1\} PK_1$
5. Data block hash sets: $\forall k \in [1, j]$ determine $R_k^1$ and compute $\forall k \in [1, j], \forall l \in R_k^1 h_1(\{B_k^1\}_{PK_l})\}_{SK_1}$
6. Initialization of the second onion structure $O_p$: compute $O_{p_1}$
7. Message generation based on W and $(N_k^1)_{k \in [1, j]}$.

The workflow messages are generated with respect to the specification defined in FIG. 7 and sent to the next servers involved. This includes the initialization of the second onion structure $O_p$ and that of data blocks which are encrypted with appropriate vertex public keys.

Figure 9:
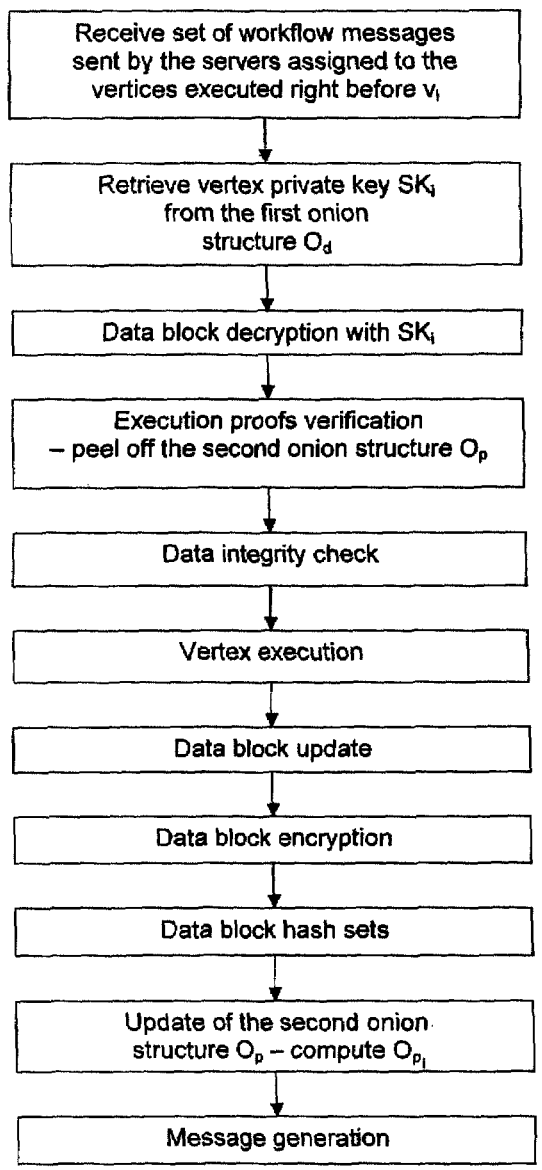
FIG. 9 shows a sequence of operations for a workflow message processing.

FIG. 9 shows a sequence of operations for a workflow message processing. A server $b_i$ being assigned to a vertex $v_i$ proceeds as follows upon receipt of the set of workflow messages $(M_{j_p \rightarrow i})_{p \in [1, k_i]}$ sent by $k_i$ servers assigned to the vertices $(v_{j_p})_{p \in [1, k_i]}$ executed right before $v_i$.
1. Retrieve $SK_i$ from the first onion structure $O_d$
2. Data block decryption with $SK_i$ based on $J_i^r$
3. Execution proofs verification: peel off the second onion structure $O_p$
4. Data integrity check based on W and $P_W$
5. Vertex execution
6. Data block update: compute $\forall k \in J_i^w \text{sign}_i(d_k)$ and update $d_k$ content
7. Data block encryption: $\forall k \in J_i^r$ determine $N_k^i$ and compute $\forall k \in J_i^r, \forall l \in N_k^i \{B_k^i\} PK_1$
8. Data block hash sets: $\forall k \in J_i^w$ determine $R_k^i$ and compute $\forall k \in J_i^w, \forall l \in R_k^i h_1(\{B_k^i\} PK_1)\}_{SK_i}$
9. Second onion structure $O_p$ update: compute $O_{p_i}$
10. Message generation based on W and $(N_k^i)_{k \in [1, j]}$ After having retrieved $SK_i$ from the first onion structure $O_d$, server $b_i$ verifies the integrity of workflow data and that the execution of the workflow up to his workflow is consistent with the second onion structure $O_p$. Workflow data are then processed during the execution of $v_i$ and data blocks are updated and encrypted upon completion. Finally, server $b_i$ computes $O_{p_i}$ and issues the set of workflow messages $(M_{i \rightarrow j})_{j \in [1, z_i]}$ to the intended servers in accord with the execution pattern of the workflow.

For the security of the workflow execution, there are several alternatives with respect to the management of the policy key pair $(PK_{pol_i}, SK_{pol_i})$, including single key distribution based on the policy compliance, group key management or policy-based cryptography. Amongst those alternatives, only the policy based cryptography scenario as part of the security evaluation of the object is discussed herein. In the following two assumptions are made:
1. IND-PB-CCA: the policy-based encryption scheme used in the specification of $(PK_{pol_i}, SK_{pol_i})_{[1,n]}$ is semantically secure against a chosen ciphertext attack for a policy-based encryption and the associated policy-based signature scheme achieves signature unforgeability.
2. IND-CCA: the public key encryption scheme used in the specification of $(PK_i, SK_i)_{[1,n]}$ is semantically secure against a chosen ciphertext attack the associated signature scheme achieves signature unforgeability.

The integrity of the distributed workflow execution is ensured. This basically means that workflow data are accessed and modified by authorized servers based on the pre-defined plan specified by means of the sets $J_i^r$ and $J_i^w$.

This property is ensured by the first onion structure $O_d$ which assures the vertex key distribution used in the access to workflow data based on the workflow execution plan. Assuming that a workflow initiator server builds $O_d$ based on the methodology specified before and under IND-PB-CCA, thus it is not feasible for an adversary A to extract the vertex private key $SK_i$ from $O_d$ if A does not satisfy the set of policies $(pol_{i_k})_{k \in [1, l]}$ associated with the set of vertices $(v_{i_k})_{k \in [1, l]}$ executed prior to $v_i$ in workflow W. This is true as the structure of $O_d$ is mapped to workflow W.

Upon receipt of a workflow message, a server is sure that the workflow has been properly executed so far provided that he trusts the servers satisfying the policy $pol_i$.

This means that an adversary that does not verify a policy that is trusted by some servers cannot forge a workflow instance, i.e. that he cannot produce a workflow message faking a valid workflow instance. This property is enforced by the second onion structure $O_p$. Assuming that a workflow initiator server builds the second onion structure $O_p$ based on the methodology specified above and under IND-PB-CCA, the second onion structure $O_p$ unforgeable. To assure the unforgeability property, it has to be verified that:
1. A genuine second onion structure $O_p$ built during a previous instance of a workflow cannot be replayed.
2. A second onion structure $O_p$ cannot he built by an adversary that is not trusted by servers.

The first property is enforced by the fact that a second onion structure $O_p$ properly built by trustworthy peers is bound to a specific workflow policy $P_W$ and thus cannot be reused during an attempt to execute a malicious workflow instance. The second property is straightforward under IND- PB-CCA as the policy-based signature scheme achieves signature unforgeability. Thus, an adversary cannot produce a valid onion $$O_{P_1} : l_1 = \left\{ \{h_1(P_W)\}_{SK_{pol_1}} \right\}.$$

Assuming servers involved in a workflow instance do not share vertex private keys they retrieve from the first onion structure $O_d$, the approach achieves the following data integrity properties:
1. Data truncation and insertion resilience: any server can detect the deletion or the insertion of a piece of data in a workflow message.
2. Data content integrity: any server can detect the integrity violation of a data block content in a workflow message.

The first property is ensured as the set of workflow data blocks that should be present in a workflow message is specified in $P_W$, the workflow message formatting has thus to be compliant with the workflow specification. The second property is assured by the fact that an adversary cannot modify a given data block without providing a valid signature on this data block. This property relies on the unforgeability of the signature scheme used in the data block and hash set specifications.

These three security properties enable a coherent and secure execution of distributed workflows. Yet the approach can still be optimized to avoid the replication workflow messages. A server may indeed send the same workflow message several times to different servers satisfying the same security policy resulting in concurrent executions of the given workflow instance. An approach based on a stateful service discovery mechanism can be envisioned to cope with this problem.

In prior technical work that describes preventing information leakage within workflows that execute among competing organizations, and/or that describe a chinese wall security model for decentralized workflow systems, mechanisms are proposed for the management of conflicts of interest during the distributed execution of workflows. These pieces of work specify solutions in the design of access control policies to prevent servers from accessing data that are not part of their classes of interest. These approaches do not address the issue policy enforcement with respect to integrity of execution in fully decentralized workflow management systems. Nonetheless, the access control policy models described in this work can be used to augment the above approach especially in the specification of the sets $J_i^r$ and $J_i^w$ at workflow design time.

Onion encryption techniques have been introduced in a variety of technical publications. In contrast to this the above described approach maps onion structures with workflow execution patterns in order to built proofs of execution and enforce access control on workflow data. As a result, more complex business scenarios are supported by the present approach than usual onion routing solutions. Furthermore, combined with policy encryption techniques, the present approach provides a secure runtime environment for the execution of fully decentralized workflows supporting runtime assignment of servers, a feature which had not been tackled so far.

Finally the present approach is suitable for any business scenarios in which business roles can be mapped to security policies that can be associated with key pairs. It can thus be easily integrated into existing security policy models such as chinese wall security model.

In the above, mechanisms were presented towards meeting the security requirements raised by the execution of workflows in a decentralized setting. The present approach, capitalizing on onion encryption techniques and security policy models, protects the access to workflow data with respect to a pre-defined workflow execution pattern/plan and provides proofs of execution to servers. Those mechanisms can easily be integrated into the runtime specification of decentralized workflow management systems and are further suitable for fully decentralized workflow supporting the runtime assignment of servers to workflow tasks. These mechanisms will foster the development of dynamic business applications whereby workflow actors do not need to rely on a dedicated infrastructure to provide their resources as one of the major flaws slowing down this trend was the lack of security.

The invention claimed is:

1. A method for a secure execution of workflow tasks of a workflow to be executed according to an execution pattern in a distributed workflow management system within a decentralized network system with a plurality of servers ($b_0$, $b_1$, ..., $b_n$) including at least an initiator server and at least one or more groups of servers, the execution pattern being stateless such that, upon completion of required workflow tasks, each server sends all workflow data to a next server and is able to go offline during a remainder of the execution pattern, the initiator server executing a first set of the workflow tasks, each of the one or more groups of servers satisfying a policy ($pol_i$) of a vertex ($v_i$), and thus, knowing a corresponding policy key pair including a policy private key ($SK_{poli}$) and a policy public key ($PK_{poli}$), wherein each vertex ($v_i$) denotes a set of workflow tasks to be executed in accordance with the execution pattern and is assigned a vertex key pair including a vertex private key ($SK_i$) and a vertex public key ($PK_i$), and wherein vertex private keys and policy public keys are jointly encrypted within a first onion structure ($O_d$), the first onion structure ($O_d$) being built up of a number of onion layers representing the execution pattern that defines a succession of vertices such that each onion layer is decryptable by using the policy private key of exactly one vertex ($v_i$), thus revealing a corresponding vertex private key ($SK_i$), the method comprising, starting at an i'th server, the i'th server being different than the initiator server, being a server of one of the one or more groups of servers, and being assigned at runtime based on a service discovery mechanism in accordance with the execution pattern to execute one vertex of the workflow, the policy comprising credentials the i'th server satisfies in order to be assigned to a respective vertex, called herein the i'th vertex, at least the following operations:
receiving, over a network at the i'th server, the first onion structure ($O_d$) with an outermost layer including an i'th vertex private key ($SK_i$) and encrypted with an i'th policy public key ($PK_{poli}$);
receiving, over the network at the i'th server, the workflow originating from the initiator server, the workflow including all of the workflow data, wherein all of the workflow data includes a subset of workflow data encoded by an i'th vertex public key ($PK_i$);
decoding, at the i'th server, the i'th vertex private key ($SK_i$) by using a known i'th policy private key ($PK_{poli}$);
decoding, at the i'th server, the workflow data encoded by the i'th vertex public key ($PK_i$) from the workflow by using the i'th vertex private key ($SK_i$);
processing, at the i'th server, a second onion structure ($O_{pi-1}$) to verify an integrity of the workflow data, the second onion structure ($O_p$) being built at each execution step with vertex private keys based on the execution pattern and being initialized by the initiator server, so that the i'th server ($b_i$) receives the second onion structure ($O_{pi-1}$) with (i−1) layers and encodes the second onion structure ($O_{pi-1}$) to provide the extended second onion structure ($O_{pi}$) by encrypting an upper layer with the i'th vertex private key ($SK_i$) to extend the second onion structure ($O_{pi-1}$) up to i layers sent to at least one (i+1)'th server as one server of the one or more groups of servers satisfying a policy ($pol_{i+1}$) of an (i+1)'th vertex ($v_{i-1}$) as the next vertex in the succession of vertices upon completion of the i'th vertex;

encoding, at the i'th server, the second onion structure ($O_{pi-1}$) to provide an extended second onion structure ($O_{pi}$);

based on verifying, executing the i'th vertex ($v_i$) and processing, at the i'th server, decoded workflow data accordingly;

updating, at the i'th server, the workflow according to an executed i'th vertex ($v_i$) and processed workflow data to provide an updated workflow;

assigning at least one (i+1)'th server of one of the one or more groups of servers based on the service discovery mechanism in accord with the execution pattern; and sending the updated workflow, a partly decoded first onion structure ($O_d$), and the extended second onion structure ($O_{pi}$) to the at least one (i+1)'th server, the (i+1)'th server being a server of one of the one or more groups of servers satisfying a policy ($pol_{i+1}$) of an (i+1)'th vertex ($v_{i+1}$) as a next vertex in the succession of vertices.

2. The method according to claim 1, wherein updating the workflow comprises encoding at least the processed workflow data with an (i+1)'th vertex public key ($PK_{i+1}$) corresponding to the succession of vertices and adding the processed workflow data to the workflow.

3. The method according to claim 2, wherein the i'th server ($b_i$) choses the (i+1)'th server ($b_{i+1}$) at runtime to execute the (i+1)'th vertex ($v_{i+1}$) as the vertex following the i'th vertex ($v_i$) in the succession of vertices.

4. The method according to claim 2, wherein the processed workflow data are included in a data block consisting of two fields, the processed workflow data that have last been modified during execution of the i'th vertex ($v_i$) and a signature, and wherein the data block is associated with a set of signatures that is computed by the i'th server ($b_i$) assigned to the i'th vertex ($v_i$) at runtime.

5. The method according to claim 4, wherein the data block and the set of signatures can be determined according to the following formulas:

$$B_k^a = (d_k, \text{sign}_a(d_k))$$

$$\text{sign}_a(d_k) = \{h_1(d_k)\}_{SK_a}$$

wherein $d_k$ is the actual processed workflow data, $h_1$ is a first hash function, and $SK_a$ the private vertex key of the vertex a.

6. The method according to claim 1, wherein the first onion structure ($O_d$) is determined by the initiator server.

7. The method according to claim 1, wherein the i'th server ($b_i$) sends a workflow message to the (i+1)'th server ($b_{i+1}$) upon execution of the i'th vertex ($v_i$) and updating of the workflow, the workflow message including the updated workflow, the partly decoded first onion structure ($O_d$) and the extended second onion structure ($O_{pi}$) so that the (i+1)'th server can first retrieve an (i+1)'th vertex private key ($SK_{i+1}$) from the first onion structure ($O_d$), can verify compliance of a workflow execution with the execution pattern using the extended second onion structure ($O_{pi}$), and can execute the (i+1)'th vertex ($v_{i+1}$) and process the workflow data accordingly.

8. The method according to claim 7, wherein the second onion structure ($O_p$) is initiated by the initiator server, which computes the first layer as an inner most layer by determining a hash value of a workflow policy using a first hash function and encoding the hash value using the policy private key of a first vertex according to the succession of vertices.

9. The method according to claim 8, wherein the workflow policy is defined by the initiator server.

10. The method according to claim 1, wherein each vertex key pair ($SK_i$, $PK_i$) assigned to exactly one vertex ($v_i$) is defined for a single instance of the workflow such that each vertex key pair cannot be reused during any other workflow instance.

11. The method according to claim 1, wherein the first onion structure ($O_d$) represents a sequence workflow pattern described by the following formula:

$$O_d : \begin{cases} l_1 = \{SK_n\} \\ l_i = \left\{\{l_{i-1}\}_{PK_{pol_{n-i+2}}}, SK_{n-i+1}\right\} \text{ for } i \in [2, n] \\ l_{n+1} = \left\{\{l_n\}_{PK_{pol_1}}\right\} \end{cases}$$

wherein $l_j$ describes the j'th layer of the onion structure $O_d$, $SK_j$ is a j'th policy public key, wherein $j \in [1,n]$.

12. The method according to claim 1, wherein the first onion structure ($O_d$) represents a AND-SPLIT workflow pattern described by the following formula:

$$O_{d1} = \{SK_1, O_{d2}, O_{d3}, \ldots, O_{dn}\}$$

$$O_{di} = \left\{\{SK_i\}_{PK_{pol_i}}\right\} \text{ for } i \in [2, n-1]$$

wherein $O_{dj}$ is an onion as part of the onion structure $O_d$, $SK_j$ is a j'th vertex private key, and $PK_{pol_j}$ is a j'th policy public key, wherein $j \in [1,n]$, being an integer value.

13. The method according to claim 1, wherein the first onion structure ($O_d$) represents a AND-JOIN workflow pattern described by the following formula:

$$O_{d1} = \{SK_1, O_{d2}, O_{d3}, \ldots, O_{dn}\}$$

$$O_{di} = \left\{\{SK_i\}_{PK_{pol_i}}\right\} \text{ for } i \in [2, n-1]$$

wherein $O_{dj}$ is an onion as part of the onion structure $O_d$, $PK_{pol_j}$ is a j'th policy public key, the vertex private key $SK_n$ is divided into n−1 parts and defined by $SK_n = SK_{n_1} \oplus SK_{n_2} \oplus \ldots \oplus SK_{n_{n-1}}, \lambda$ is the onion structure, wherein $j \in [1, n-1]$, n being an integer value.

14. The method according to claim 1, wherein the first onion structure ($O_d$) represents a OR-SPLIT workflow pattern described by the following formula:

$$O_{d1} = \left\{\{\lambda, SK_{n_1}\}_{PK_{pol_n}}\right\}$$

$$O_{di} = \left\{\{SK_{n_j}\}_{PK_{pol_n}}\right\} \text{ for } i \in [2, n-1]$$

wherein $_{Odj}$ is an onion as part of the onion structure $O_d$, $PK_{pol_j}$ is a j'th policy public key, and $SK_j$ is a j'th vertex private key, wherein j∈[1,n−1], n being an integer value.

15. The method according to claim 1, wherein the first onion structure ($O_d$) represents a OR-JOIN workflow pattern described by the following formula:

$$O_d : \begin{cases} l_1 = \{\lambda, SK_n\} \\ l_2 = \{\{l_1\}_{PK_{pol_n}}\} \end{cases}$$

wherein $PK_{pol_n}$ is an n'th policy public key, and $SK_n$ is an n'th vertex private key, λ is the onion structure, and $l_1$ and $l_2$ layers of the onion structure $O_d$.

16. The method according to claim 1, wherein the vertex key pairs are defined as follows: i∈[1,n], n being an integer value $$\begin{cases} PK_i = h_1(W_{iid} \oplus S_W \oplus v_i) \\ SK_i = s \times h_2(PK_i) \end{cases}$$

wherein $s \in \mathbb{Z}_q^*$ for a prime q, s is called a master key held by the initiator server, $h_2$ is a second hash function, $W_{iid}$ is a string, called workflow instance identifier, $S_w$ denotes a workflow specification, $v_i$ is the i'th vertex, and the vertex key pairs ($PK_i, SK_i$) are calculated upon creation of the workflow pattern.

17. A system configured to be used for a secure execution of workflow tasks of a workflow to be executed according to a given execution pattern within a decentralized network system with a plurality of servers ($b_0, b_1, \ldots, b_n$), the system including at least an initiator server and at least one or more groups of servers, the execution pattern being stateless such that, upon completion of required workflow tasks, each server sends all workflow data to a next server and is able to go offline during a remainder of the execution pattern, the initiator server executing a first set of the workflow tasks, each of the one or more groups of servers satisfying a policy ($pol_i$) of a vertex ($v_i$), and thus, knowing a corresponding policy key pair including a policy private key ($SK_{poli}$) and a policy public key ($PK_{poli}$), wherein each vertex ($v_i$) denotes a set of workflow tasks to be executed in accordance with the execution pattern and is assigned a vertex key pair including a vertex private key ($SK_i$) and a vertex public key ($PK_i$), and wherein vertex private keys and policy public keys are jointly encrypted within a first onion structure ($O_d$), the first onion structure ($O_d$) being built up of a number of onion layers representing the execution pattern that defines a succession of vertices such that each onion layer is decryptable by using the policy private key of exactly one vertex ($v_i$) thus revealing a corresponding vertex private key ($SK_i$), wherein an i'th server, the i'th server being different than the initiator server, being a server of one of the one or more groups of servers, and being assigned at runtime based on a service discovery mechanism in accordance with the execution pattern to execute one vertex of the workflow, the policy comprising credentials the i'th server satisfies in order to be assigned to a respective vertex, called herein the i'th vertex, at least the following operations:

receiving, over a network at the i'th server, the first onion structure ($O_d$) with an upper most layer including the i'th vertex private key ($SK_i$) and being encrypted with an i'th policy public key ($PK_{poli}$);

receiving, over a network at the i'th sever, the workflow originating from the initiator server, the workflow including all of the workflow data, wherein all of the workflow data includes a subset of workflow data encoded by an i'th vertex public key ($PK_i$);

decoding, at the i'th server, the i'th vertex private key ($SK_i$) by using a known i'th policy private key;

decoding, at the i'th server, the workflow data encoded by the i'th vertex public key ($PK_i$) from the workflow by using the i'th vertex private key ($SK_i$);

processing, at the i'th server, a second onion structure ($O_{pi-1}$) to verify an integrity of the workflow data, the second onion structure ($O_p$) being built at each execution step with vertex private keys based on the execution pattern and being initialized by the initiator server, so that the i'th server ($b_i$) receives the second onion structure ($O_{pi-1}$) with (i-1) layers and encodes the second onion structure ($O_{pi-1}$) to provide the extended second onion structure ($O_{pi}$) by encrypting an upper layer with the i'th vertex private key ($SK_i$) to extend the second onion structure ($O_{pi-1}$) up to i layers sent to at least one (i+1)'th server as one server of the one or more groups of servers satisfying a policy ($pol_{i+1}$) of an (i+1)'th vertex ($v_{i+1}$) as the next vertex in the succession of vertices upon completion of the i'th vertex;

encoding, at the i'th server, the second onion structure ($O_{pi-1}$) to provide an extended second onion structure ($O_{pi}$);

based on verifying, executing the i'th vertex ($v_i$) and processing, at the i'th server, decoded workflow data accordingly;

updating, at the i'th server, the workflow according to an executed i'th vertex ($v_i$) and processed workflow data to provide an updated workflow;

assigning at least one (i+1)'th server of one of the one or more groups of servers based on the service discovery mechanism in accord with the execution pattern; and sending the updated workflow, a partly decoded first onion structure ($O_d$), and the extended second onion structure ($O_{pi}$) to the at least one (i+1)'th server, the (i+1)'th server being a server of one of the one or more groups of servers satisfying a policy ($pol_{i+1}$) of an (i+1)'th vertex ($v_{i+1}$) as a next vertex in the succession of vertices.

18. An initiator server for initiating a secure execution of workflow tasks of a workflow to be executed according to a given execution pattern within a decentralized network system with a plurality of servers ($b_0, b_1, \ldots, b_n$) including at least one or more groups of servers, the execution pattern being stateless such that, upon completion of required workflow tasks, each server sends all workflow data to a next server and is able to go offline during a remainder of the execution pattern, the initiator server executing a first set of workflow tasks and being different than other servers of the plurality of servers, each of the one or more groups of servers satisfying a policy ($pol_i$) of a vertex ($v_i$), and thus, knowing a corresponding policy key pair including a policy private key ($SK_{poli}$) and a policy public key ($PK_{poli}$), wherein each vertex ($v_i$) denotes a set of workflow tasks to be executed in accordance with the execution pattern and is assigned a vertex key pair including a vertex private key ($SK_i$) and a vertex public key ($PK_i$), and wherein the initiator server is configured to encrypt vertex private keys and policy public keys jointly within a first onion structure ($O_d$), the first onion structure ($O_d$) being built up of a number of onion layers representing the execution pattern that defines a succession of vertices such that each onion layer is decryptable by using the policy private key of exactly one vertex ($v_i$) thus revealing a corresponding vertex private key ($SK_i$), wherein the initiator server is further configured to assign at least one server of the one or more groups of servers at runtime of the workflow in accordance with the execution pattern, based on a service discovery mechanism, to execute one vertex of the workflow, the workflow including all of the workflow data, wherein all of the workflow data includes a subset of workflow data encoded by an i'th vertex public key ($PK_i$).

19. The initiator server according to claim 18, which is one server of at least one of the groups of servers, each group satisfying a policy ($pol_i$) of a vertex.

20. The initiator server according to claim 18, which is configured to initialize, along with the execution pattern, a second onion structure ($O_p$) extending at each execution step with vertex private keys based on the execution pattern, so that an i'th server assigned at runtime, based on a service discovery mechanism, to execute the i'th vertex can receive the second onion structure ($O_p$) with (i−1) layers and can encrypt an upper layer with an i'th vertex private key ($SK_i$) to extend the second onion structure ($O_p$) up to i layers sent to at least one (i+1)'th server as one server of the one or more groups of servers satisfying a policy ($pol_{i+1}$) of an (i+1)'th vertex ($v_{i+}1$) as the next vertex in the succession of vertices upon completion of the i'th vertex.

21. The initiator server according to claim 20, wherein the initiator server can initialize the second onion structure ($O_p$) by computing a first layer as an inner most layer by determining a hash value of a workflow policy using a first hash function and encoding the hash value by using the policy private key of a first vertex according to the succession of vertices.

22. The initiator server according to claim 21, wherein the initiator server is configured to define the workflow policy.

23. A method for a secure execution of workflow tasks of a workflow to be executed according to an execution pattern in a distributed workflow management system with a plurality of servers, the execution pattern being stateless such that, upon completion of required workflow tasks, each server sends all workflow data to a next server and is able to go offline during a remainder of the execution pattern, each server satisfying a policy of a vertex of the workflow, and thus, knowing a corresponding policy private key and a corresponding policy public key, the method comprising, starting at an i'th server which is assigned at runtime based on a service discovery mechanism in accordance with the execution pattern to execute the i'th vertex of the workflow, the policy comprising credentials the i'th server satisfies in order to be assigned to a respective vertex, called herein the i'th vertex, at least the following operations:
  receiving, over a network at the i'th server, a first onion structure being built up of a number of onion layers representing the execution pattern with an outermost layer including an i'th vertex private key assigned to the i'th vertex and encrypted with an i'th policy public key;
  receiving, over the network at the i'th server, the workflow originating from an initiator server, the workflow including all of the workflow data, wherein all of the workflow data includes a subset of workflow data encoded by a corresponding i'th vertex public key, the initiator server executing a first set of workflow tasks and being different than the i'th server;
  decoding, at the i'th server, the i'th vertex private key by using an i'th policy private key;
  decoding, at the i'th server, the workflow data encoded by the i'th vertex public key from the workflow by using the i'th vertex private key;

processing, at the i'th server, a second onion structure ($O_{pi-1}$) to verify an integrity of the workflow data, the second onion structure ($O_p$) being built at each execution step with vertex private keys based on the execution pattern and being initialized by the initiator server, so that the i'th server ($b_i$) receives the second onion structure ($O_{pi+1}$) with (i −1) layers and encodes the second onion structure ($O_{pi-1}$) to provide the extended second onion structure ($O_{pi}$) by encrypting an upper layer with the i'th vertex private key ($SK_i$) to extend the second onion structure ($O_{pi-1}$) up to i layers sent to at least one (i+1)'th server as one server of the one or more groups of servers satisfying a policy ($pol_{i+1}$) of an (i+1)'th vertex ($v_{i+1}$) as the next vertex in the succession of vertices upon completion of the i'th vertex;
  encoding, at the i'th server, the second onion structure ($O_{pi-1}$) to provide an extended second onion structure ($O_{pi}$);
  based on verifying, executing the i'th vertex ($v_i$) and processing, at the i'th server, decoded workflow data accordingly;
  updating, at the i'th server, the workflow according to an executed i'th vertex (v) and processed workflow data to provide an updated workflow;
  assigning at least one (i+1)'th server of one of the one or more groups of servers based on the service discovery mechanism in accord with the execution pattern; and
  sending the updated workflow, a partly decoded first onion structure ($O_d$), and the extended second onion structure ($O_{pi}$) to the at least one (i+1)'th server, the (i+1)'th server being a server of one of the one or more groups of servers satisfying a policy ($pol_{i+1}$) of an (i+1)'th vertex ($v_{i+1}$) as a next vertex in the succession of vertices.

24. A computer program product with a non-transitory computer-readable medium and a computer program stored on the computer-readable medium with a program code which is suitable for carrying out a method for a secure execution of workflow tasks of a workflow to be executed according to an execution pattern in a distributed workflow management system with a plurality of servers, the execution pattern being stateless such that, upon completion of required workflow tasks, each server sends all workflow data to a next server and is able to go offline during a remainder of the execution pattern, each server satisfying a policy of a vertex of the workflow, and thus, knowing a corresponding policy private key and a corresponding policy public key, the method when the computer program is run on a computer comprising, starting at an i'th server that is assigned at runtime based on a service discovery mechanism in accordance with the execution pattern to execute an i'th vertex of the workflow, the policy comprising credentials the i'th server satisfies in order to be assigned to a respective vertex, called herein the i'th vertex, at least the following operations:
  receiving, over a network at the i'th server, a first onion structure being built up of a number of onion layers representing the execution pattern with an outermost layer including an i'th vertex private key assigned to the i'th vertex and encrypted with an i'th policy public key;
  receiving, over the network at the i'th server, the workflow originating from an initiator server, the workflow including all of the workflow data, wherein all of the workflow data includes a subset of workflow data encoded by a corresponding i'th vertex public key, the initiator server executing a first set of workflow tasks and being different than the i'th server;
  decoding, at the i'th server, the i'th vertex private key by using the i'th policy private key;

decoding, at the i'th server, the workflow data encoded by the i'th vertex public key from the workflow by using the i'th vertex private key;

processing, at the i'th server, a second onion structure ($O_{pi-1}$) to verify an integrity of the workflow data, the second onion structure ($O_p$) being built at each execution step with vertex private keys based on the execution pattern and being initialized by the initiator server, so that the i'th server ($b_i$) receives the second onion structure ($O_{pi-1}$) with (i–1) layers and encodes the second onion structure ($O_{pi-1}$) to provide the extended second onion structure ($O_{pi}$) by encrypting an upper layer with the i'th vertex private key ($SK_i$) to extend the second onion structure ($O_{pi-1}$) up to i layers sent to at least one (i+1)'th server as one server of the one or more groups of servers satisfying a policy ($pol_{i+1}$) of an (i+1)'th vertex ($v_{i+1}$) as the next vertex in the succession of vertices upon completion of the i'th vertex;

encoding, at the i'th server, the second onion structure ($O_{pi-1}$) to provide an extended second onion structure ($O_{pi}$);

based on verifying, executing the i'th vertex ($v_i$) and processing, at the i'th server, decoded workflow data accordingly;

updating, at the i'th server, the workflow according to an executed i'th vertex ($v_i$) and processed workflow data to provide an updated workflow;

assigning at least one (i+1)'th server of one of the one or more groups of servers based on the service discovery mechanism in accord with the execution pattern; and sending the updated workflow, a partly decoded first onion structure ($O_d$), and the extended second onion structure ($O_{pi}$) to the at least one (i+1)'th server, the (i+1)'th server being a server of one of the one or more groups of servers satisfying a policy ($pol_{i+1}$) of an (i+1)'th vertex ($v_{i+1}$) as a next vertex in the succession of vertices.

25. A system configured to be used for a secure execution of workflow tasks of a workflow to be executed according to an execution pattern within a decentralized network system, the system including at least an initiator server and a plurality of servers, the execution pattern being stateless such that, upon completion of required workflow tasks, each server sends all workflow data to a next server and is able to go offline during a remainder of the execution pattern, each server satisfying a policy of a vertex of the workflow, and thus, knowing a corresponding policy key pair including a policy private key and a policy public key, wherein each vertex is assigned a vertex key pair including a vertex private key and a vertex public key, wherein an i'th server as at least one server which is to be assigned at runtime of the workflow based on a service discovery mechanism in accordance with the execution pattern to execute one of the vertices of the workflow, the policy comprising credentials the i'th server satisfies in order to be assigned to a respective vertex, called herein the i'th vertex, at least the following operations:

receiving, over a network at the i'th server, the first onion structure being built up of a number of onion layers representing the execution pattern with an upper most layer including an i'th vertex private key and being encrypted with an i'th policy public key;

receiving, over the network at the i'th server, the workflow originating from the initiator server, the workflow including all of the workflow data, wherein all of the workflow data includes a subset of workflow data encoded by an i'th vertex public key, the initiator server executing a first set of workflow tasks and being different than the i'th server;

decoding, at the i'th server, the i'th vertex private key by using a known i'th policy private key;

decoding, at the i'th server, the workflow data encoded by the i'th vertex public key from the workflow by using the i'th vertex private key;

processing, at the i'th server, a second onion structure ($O_{pi-1}$) to verify an integrity of the workflow data, the second onion structure ($O_p$) being built at each execution step with vertex private keys based on the execution pattern and being initialized by the initiator server, so that the i'th server ($b_i$) receives the second onion structure ($O_{pi-}$) with (i–1) layers and encodes the second onion structure ($O_{pi-1}$) to provide the extended second onion structure ($O_{pi}$) by encrypting an upper layer with the i'th vertex private key ($SK_i$) to extend the second onion structure ($O_{pi-1}$) up to i layers sent to at least one (i+1)'th server as one server of the one or more groups of servers satisfying a policy ($pol_{i+1}$) of an (i+1)'th vertex ($v_{i-1}$) as the next vertex in the succession of vertices upon completion of the i'th vertex;

encoding, at the i'th server, the second onion structure ($O_{pi-1}$) to provide an extended second onion structure ($O_{pi}$);

based on verifying, executing the i'th vertex ($v_i$) and processing, at the i'th server, decoded workflow data accordingly;

updating, at the i'th server, the workflow according to an executed i'th vertex ($v_i$) and processed workflow data to provide an updated workflow;

assigning at least one (i+1)'th server of one of the one or more groups of servers based on the service discovery mechanism in accord with the execution pattern; and sending the updated workflow, a partly decoded first onion structure ($O_d$), and the extended second onion structure ($O_{pi}$) to the at least one (i+1)'th server, the (i+1)'th server being a server of one of the one or more groups of servers satisfying a policy ($pol_{i+1}$) of an (i+1)'th vertex ($v_{i+1}$) as a next vertex in the succession of vertices.

* * * * *